United States Patent [19]

Schechter

[11] Patent Number: 5,255,641

[45] Date of Patent: Oct. 26, 1993

[54] VARIABLE ENGINE VALVE CONTROL SYSTEM

[75] Inventor: Michael M. Schechter, Southfield, Mich.

[73] Assignee: Ford Motor Company, Dearborn, Mich.

[21] Appl. No.: 993,746

[22] Filed: Dec. 21, 1992

Related U.S. Application Data

[63] Continuation of Ser. No. 720,115, Jun. 24, 1991, abandoned.

[51] Int. Cl.$^5$ .............................. F01L 9/02; F01L 1/34
[52] U.S. Cl. ............................... 123/90.11; 123/90.12; 123/90.15
[58] Field of Search ............... 123/90.11, 90.12, 90.13, 123/90.15

[56] References Cited

U.S. PATENT DOCUMENTS

| | | | |
|---|---|---|---|
| 2,915,052 | 12/1959 | Gullen | 123/90.11 |
| 3,240,191 | 3/1966 | Wallis | 123/478 |
| 3,361,121 | 1/1968 | Schott | 123/90.13 |
| 3,534,718 | 10/1970 | Pasquin | 123/90.13 |
| 3,741,176 | 6/1973 | Schmidt et al. | 123/90.11 |
| 3,926,159 | 12/1975 | Michelson et al. | 123/90.11 |
| 3,935,846 | 2/1976 | Zelenka | 123/90.11 |
| 3,963,006 | 6/1976 | Firey | 123/90.12 |
| 4,200,067 | 4/1980 | Trenne | 123/90.12 |
| 4,614,170 | 9/1986 | Pischinger et al. | 123/90.11 |
| 4,706,619 | 11/1987 | Buchl | 123/90.11 |
| 4,716,862 | 1/1988 | Sauro | 123/90.12 |
| 4,791,185 | 12/1988 | Tittizer | 123/90.12 |
| 4,794,891 | 1/1989 | Knobloch | 123/90.11 |
| 4,821,689 | 4/1989 | Tittizer et al. | 123/90.12 |
| 4,823,825 | 4/1989 | Buchl | 137/1 |
| 4,887,562 | 12/1989 | Wakeman | 123/90.12 |
| 4,930,464 | 6/1990 | Letsche | 123/90.12 |
| 4,930,465 | 6/1990 | Wakeman et al. | 123/90.12 |
| 4,957,075 | 9/1990 | Hasegawa | 123/90.12 |
| 4,960,083 | 10/1990 | Seki et al. | 123/90.16 |
| 4,974,495 | 12/1990 | Richeson, Jr. | 123/90.12 |
| 4,995,351 | 2/1991 | Ohkubo et al. | 123/90.15 |
| 5,193,494 | 3/1993 | Sono et al. | 123/90.12 |
| 5,193,495 | 3/1993 | Wood, III | 123/90.12 |

Primary Examiner—E. Rollins Cross
Assistant Examiner—Weilun Lo
Attorney, Agent, or Firm—Roger L. May; Jerome R. Drouillard

[57] ABSTRACT

A variable engine valve control system wherein each of the reciprocating intake and/or exhaust valves is hydraulically controlled and includes a piston subjected to fluid pressure acting on surfaces at both ends of the piston. The space at one end of the piston is connected to a source of high pressure fluid while the space at the other end is connected to a source of high pressure fluid and a source of low pressure fluid, and disconnected from each through action of controlling means such as solenoid valves. The controlling means may include a rotary hydraulic distributor coupled with each solenoid valve, thereby permitting each solenoid valve to control operation of a plurality of engine valves in succession. Equal air delivery to all engine cylinders having the aforementioned variable valve control system is assured by controlling electric pulses of variable duration and timing, the system involving means for making individual modifications of the durations of the electric pulses controlling each individual actuator, and the modifications being of such nature as to assure that all actuators control the engine intake (or exhaust) valves in an identical manner to assure equal valve strokes in all cylinders.

15 Claims, 20 Drawing Sheets

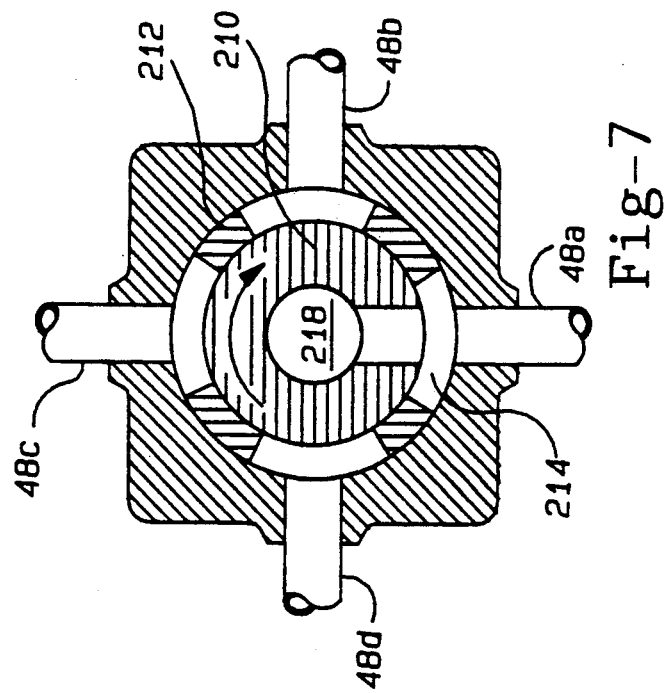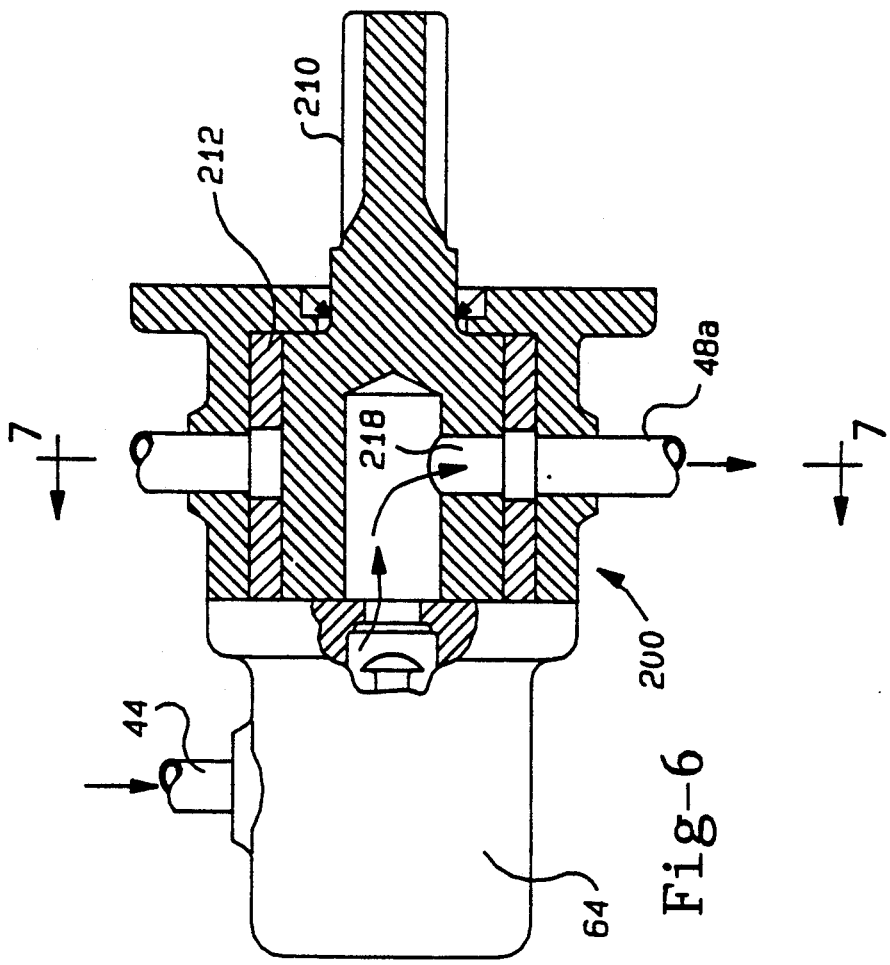

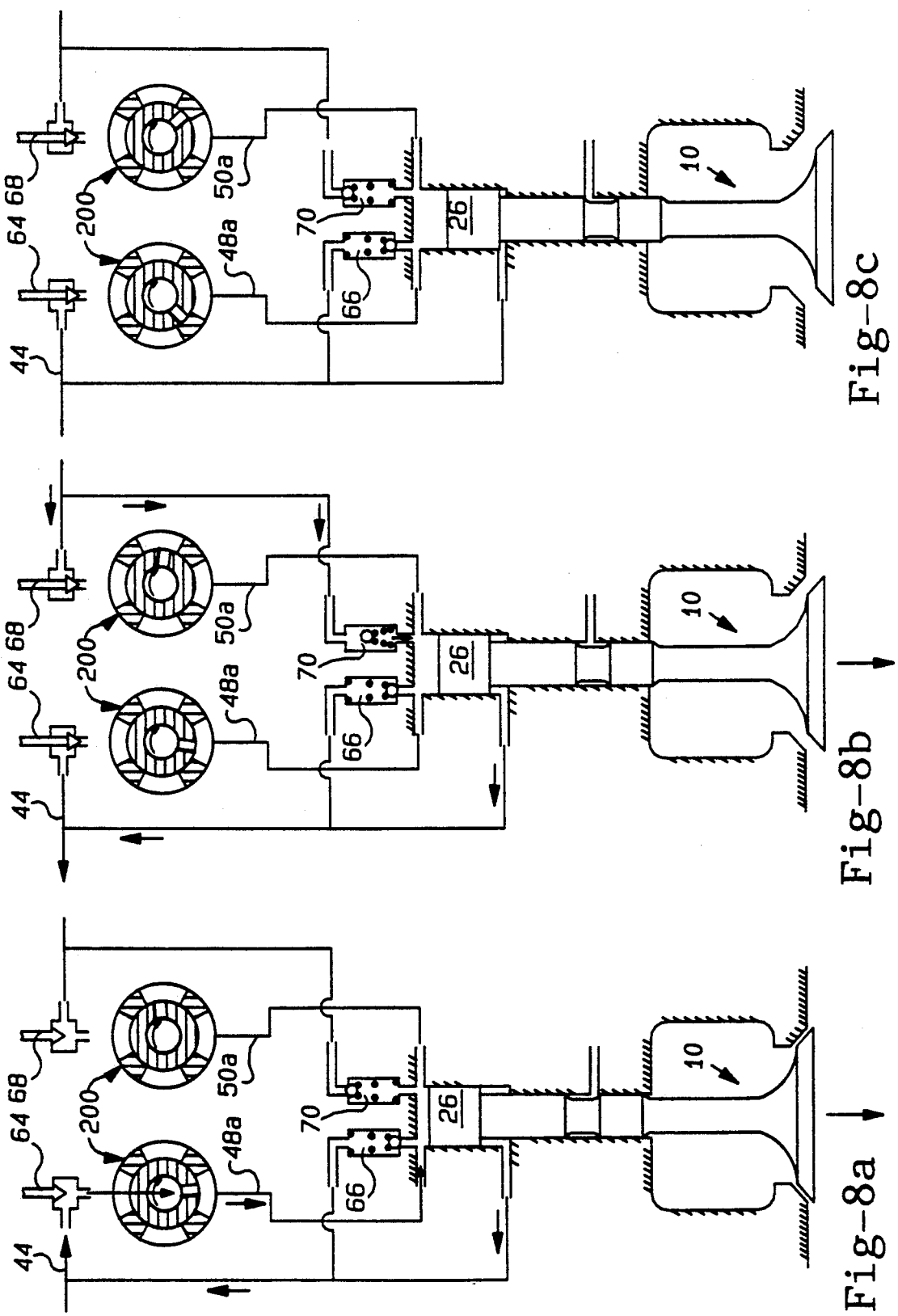

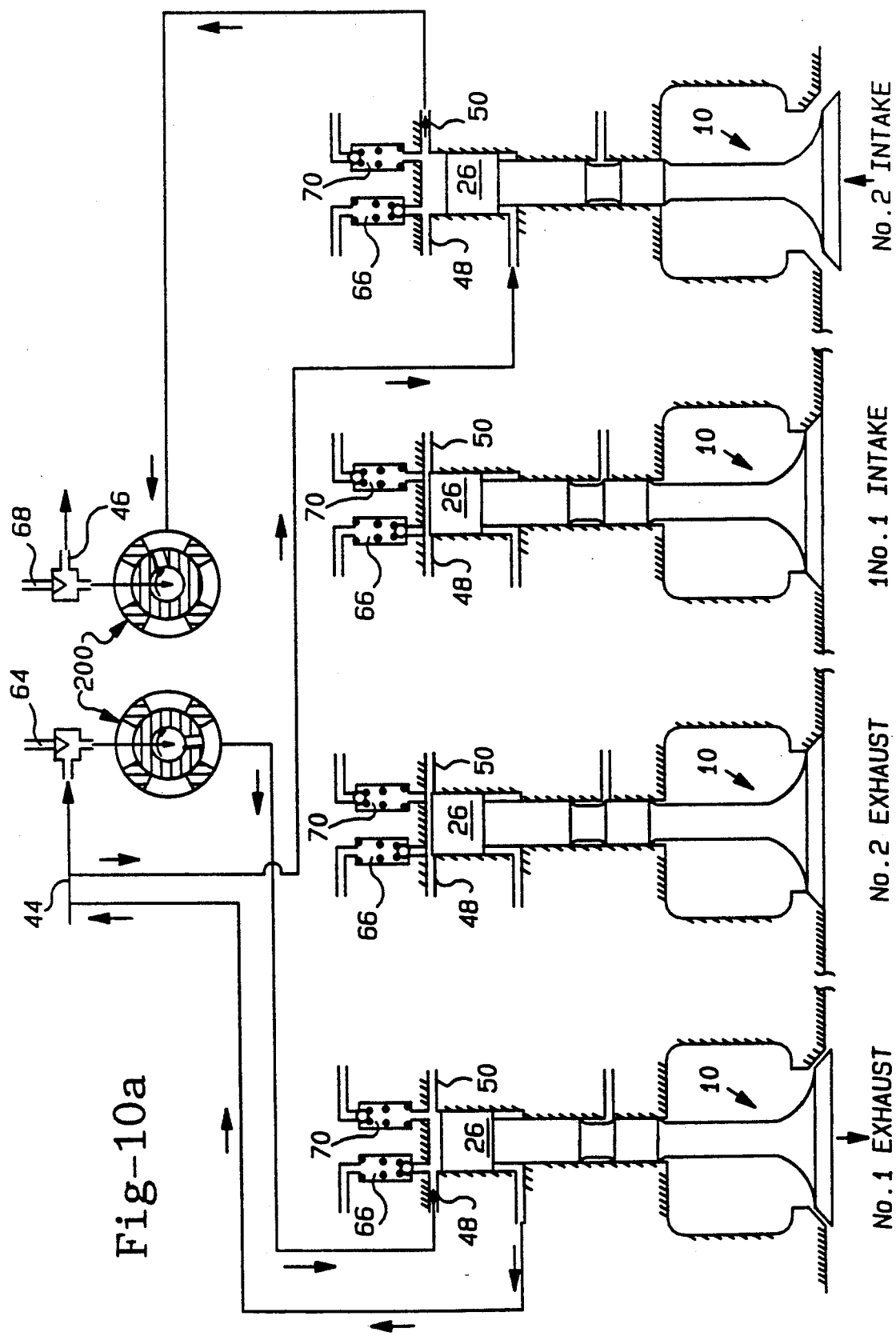

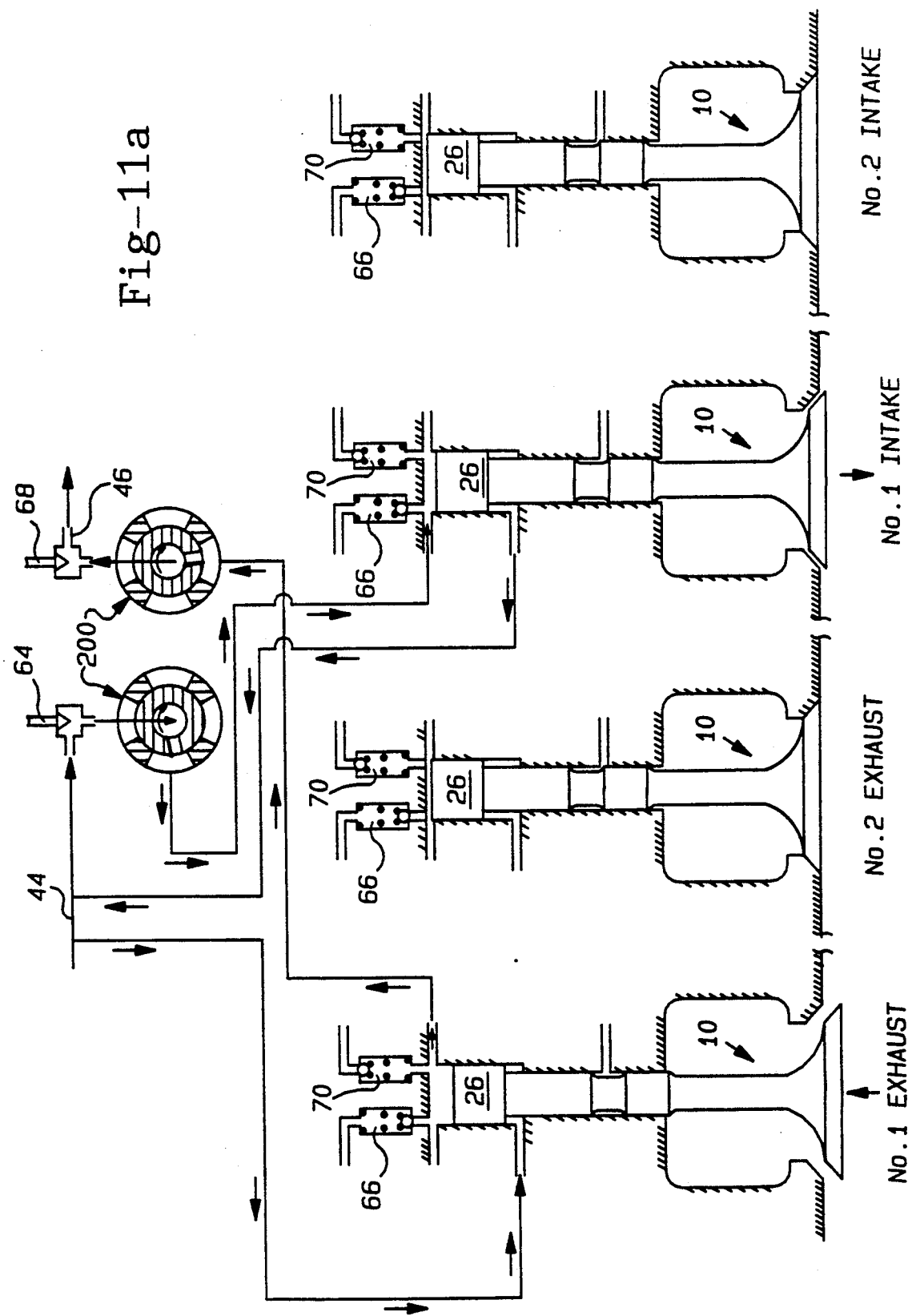

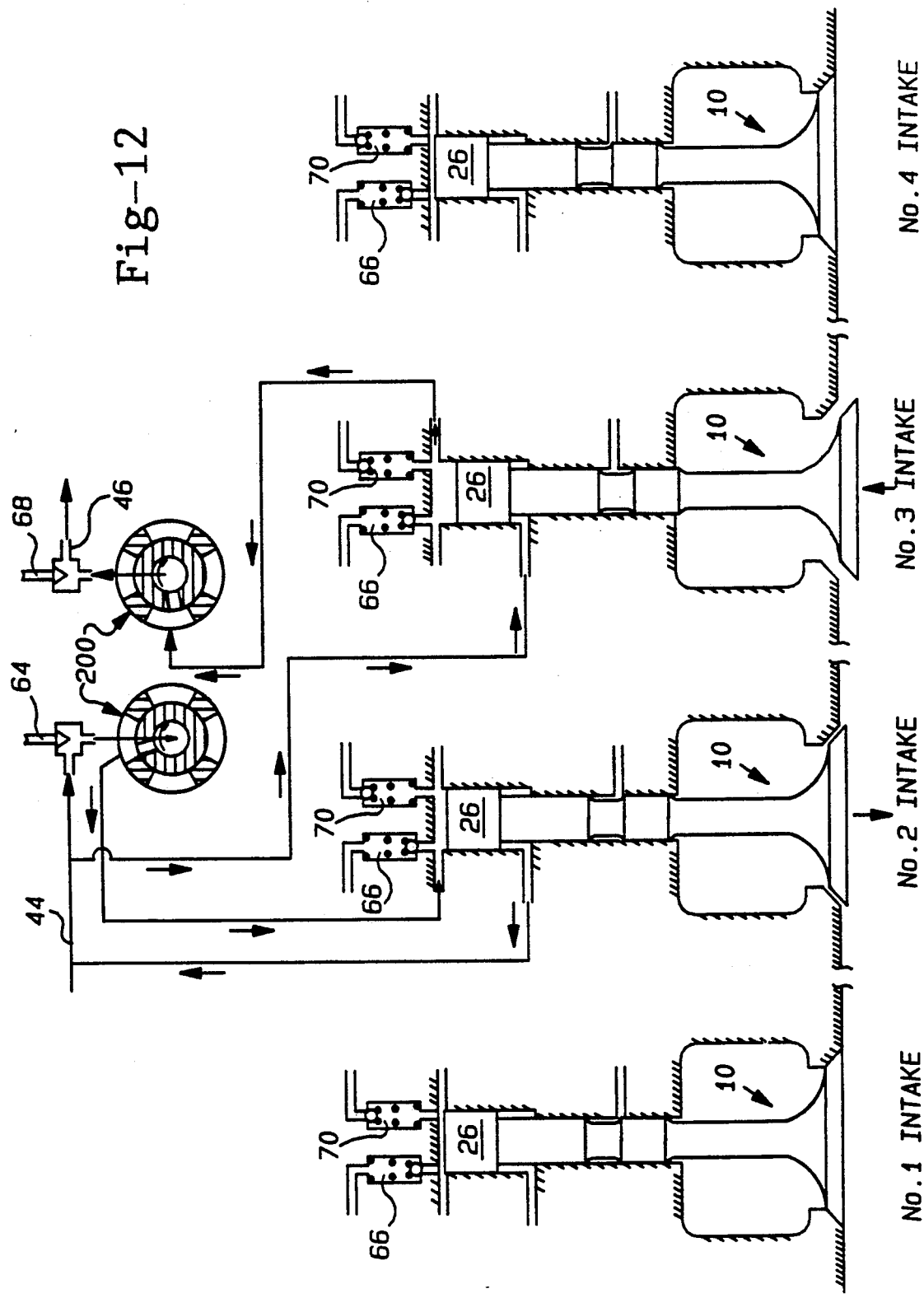

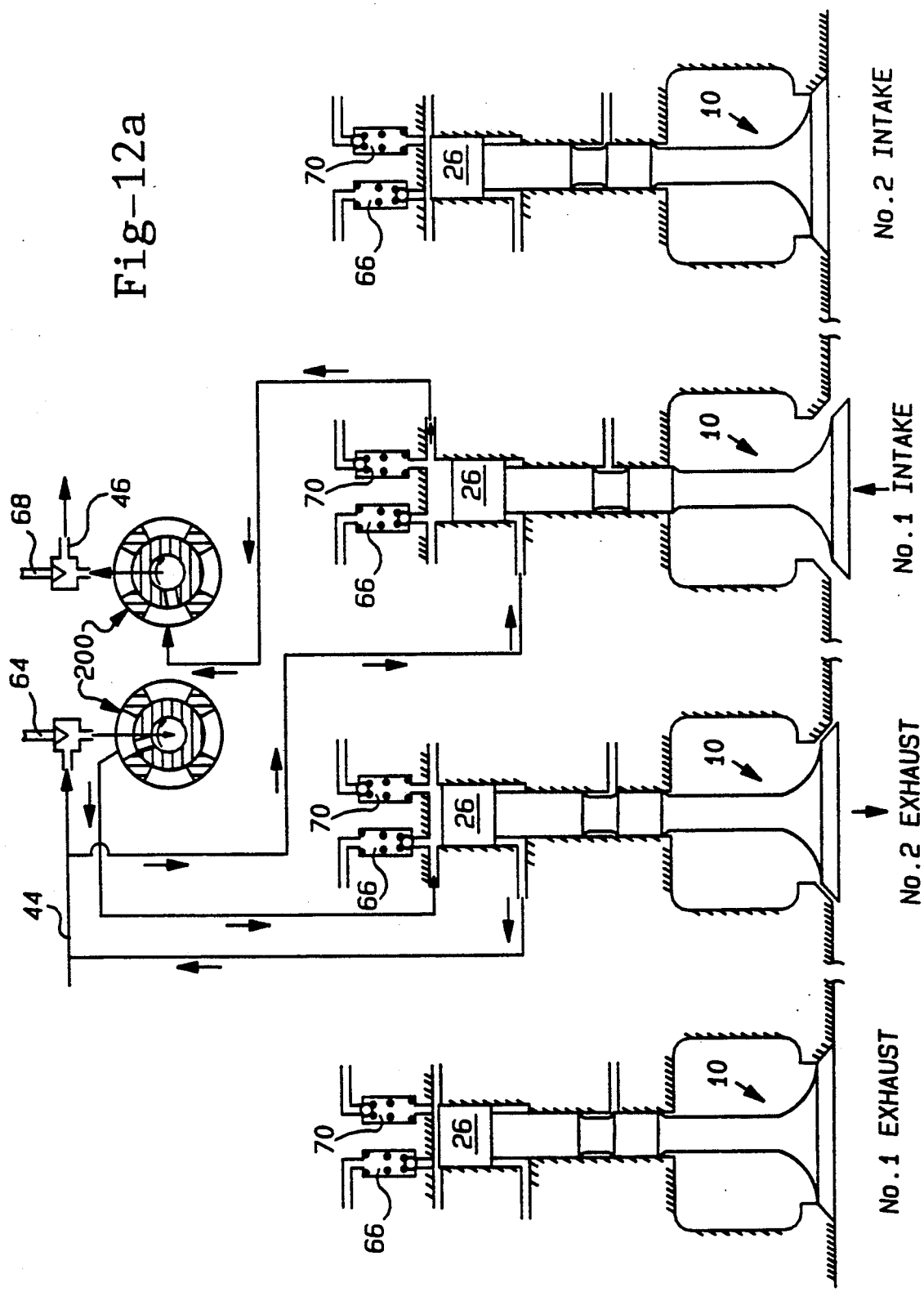

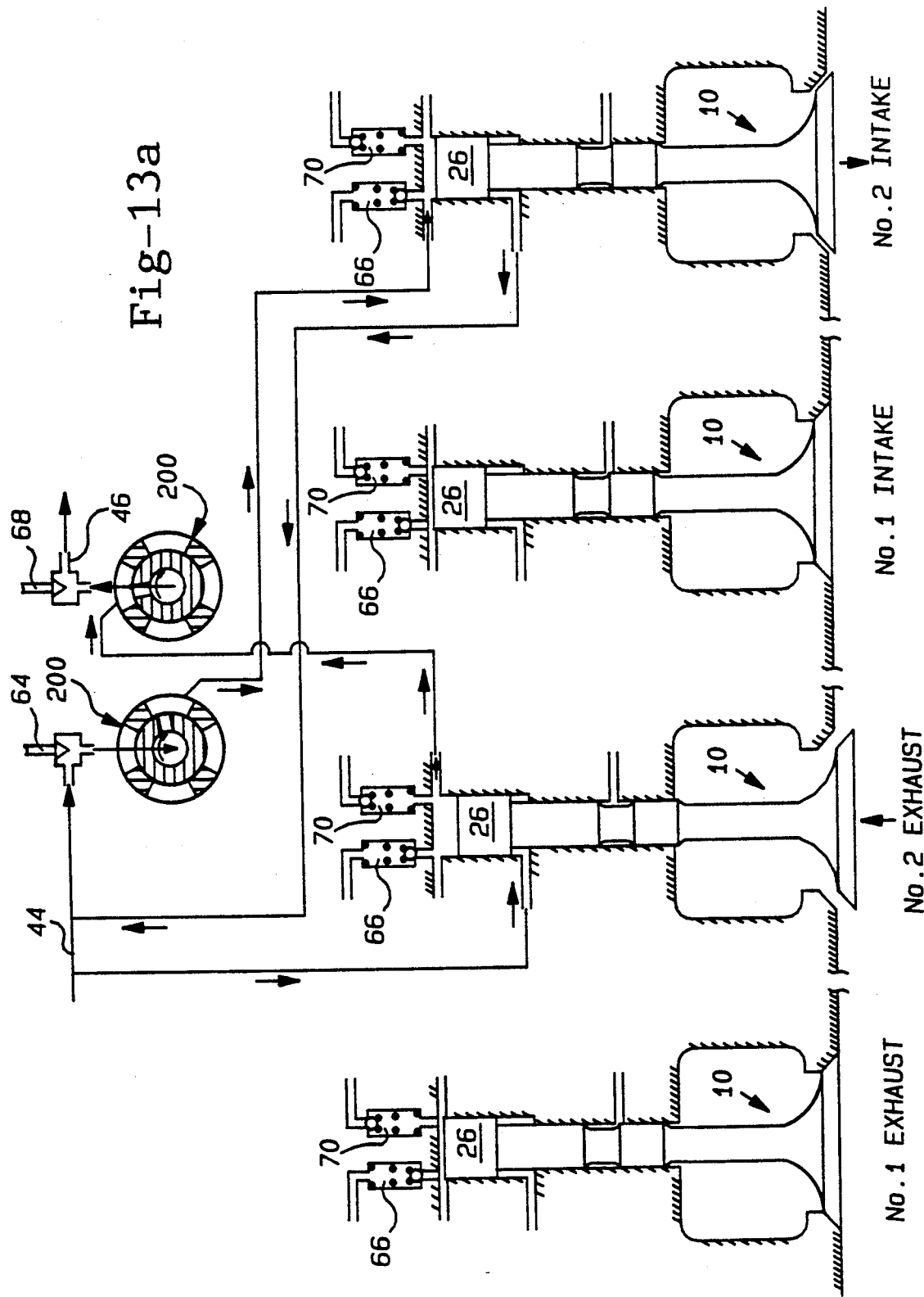

VARIABLE ENGINE VALVE CONTROL SYSTEM

This is a continuation of copending application(s) Ser. No. 07/720,115 filed on Jun. 24, 1991 now abandoned.

TECHNICAL FIELD

This invention relates to systems for variably controlling internal combustion engine intake and exhaust valves. More specifically, it relates to engine valve systems of the type in which hydraulic pressure of a pressurized fluid is used through action of solenoid valves to control the engine valves motion.

BACKGROUND ART

The enhancement of engine performance to be attained by being able to vary the acceleration, velocity and travel time of the intake and exhaust valves in an engine is well known and appreciated in the art. However, the technology for providing a straight-forward, relatively inexpensive and highly reliable system has not been forthcoming. Increased use and reliance on micro electronic control systems for automotive vehicles and increased confidence in hydraulic as opposed to mechanical systems is now making substantial progress possible. In the area of intake and exhaust engine valves, prior development has been largely dependent upon sophisticated mechanical systems such as mechanically varying phase shift and other aspects of valve timing. Increased use of multiple valve engines has also been promoted.

The use or adoption of hydraulically controlled engine valves has been quite slow. Examples of known systems include those as shown in U.S. Pat Nos. 2,915,052; 3,240,191; 3,361,121; 3,534,718; 3,926,159; 3,963,006; and 4,200,067. In some instances, such as shown in U.S. Pat. No. 3,361,121 the poppet valve is maintained in a closed position by a mechanical coil spring, yet utilizes a hydraulic actuator to bias the valves in the open position. Several of the aforementioned patents also disclose the use of a rotary distributor valve to alternately couple the hydraulic actuator ports to a source of pressurized fluid, such as shown in U.S. Pat. Nos. 2,915,052 and 4,200,067. In certain of the aforementioned patents, it is also shown that the hydraulic fluid system is used to both open and close the engine valve, such feature being shown in U.S. Pat. Nos. 2,915,052 and 3,963,006.

However, none of the aforementioned systems provide a variable engine valve control system offering the simplicity, reliability, flexibility and efficiency believed necessary for use in the high production, high performance automotive engines being produced today and those that will be required in the near future.

SUMMARY OF THE INVENTION

In all its embodiments, the present invention includes a variable engine valve control system comprising a free moving valve with a piston attached to its top. The piston is subjected to fluid pressure acting on surfaces at both ends of the piston, with the surfaces being of unequal areas. The space at one end of the piston is connected to a source of high pressure fluid while the space at the other end can be connected either to a source of high pressure fluid or to a source of low pressure fluid, or disconnected from them both through action of controlling means such as solenoid valves.

Selective actuation and deactuation of the controlling means causes an inflow of pressurized fluid into a space at one end of said piston and an outflow of fluid from the space at the other end of the piston, such action leading to a change in the balance of forces acting on the piston and causing controlled motion of the valve from one fixed position to another.

The inflow of pressurized fluid is the result of fluid expansion from a pressurized container and the outflow of fluid leads to increased fluid compression in the pressurized container.

Moreover, the potential energy of pressurized fluid is converted into kinetic energy of the moving valve during acceleration, and the kinetic energy of the valve is converted back into potential energy of pressurized fluid during valve deceleration, thereby providing what can be referred to as a "liquid spring."

Another feature of the system is the fact that the net fluid flow between the high pressure and low pressure source during operation is significantly less than the volume swept by the piston motion.

The timing of the valve opening and closing motions is controlled by varying the timing of the controlling means actuation. The stroke of the valve is determined by the duration of the controlling means actuation and the acceleration, velocity and travel time of the valve can be controlled by varying the pressure of the pressurized fluid.

The general system of the present invention as described above may be applied to an engine with more than two valves per cylinder and capable of activating selectively one or several intake (or exhaust) valves simultaneously.

It may also be applied to an engine with single intake and exhaust valves per cylinder where one pair of solenoids, for respectively controlling the transmission of high and low pressure fluid, may be used to control the intake/exhaust valves of a pair of cylinders 360° off cycle.

In one form of the invention, the controlling means includes a rotary hydraulic distributor coupled with each solenoid valve, thereby permitting each solenoid valve to control operation of several free moving valves in succession.

Further, the present invention includes a system for assuring equal air delivery to all cylinders of an engine with a variable valve control employing actuators (such as the solenoid valves previously mentioned) controlled by electric pulses of variable duration and timing, the system including means for individually modifying the duration of the electric pulses controlling each individual actuator, and the modifications being of such nature as to assure that all actuators control the engine intake (or exhaust) valves in an identical manner.

In other words, the aforementioned technique assures that in all cylinders the valve stroke opening duration and resultant lift pattern will be identical.

More specifically, the system includes individually adjusted controlling means in all engine cylinders and a control system programmed to send variable electric control signals to each such controlling means. The control signals duration consists of the algebraic sum of a basic signal duration and a correction signal duration. The basic signal duration is determined by the control system as a function of engine operating conditions and is made equal for all engine intake valves and equal for all engine exhaust valves. The correction signal may be different for each of the controlling means and is supplied to the control system just before a given controlling means must be activated. A rotatable member is provided with tags attached to it, and each tag is taken from a specific controlling means and contains information on the correction signal required by the said specific controlling means. A sensor is installed in proximity of the rotatable member, and capable of reading the information contained in the tags and transmitting it elsewhere. The rotatable member rotates during engine operation with angular velocity preferably equal to half the crankshaft velocity on a four-stroke engine or equal to crankshaft velocity on a two-stroke engine. The sensor reads the information on the individual tags successively passing the proximity of the sensor and transmits it to the control system. The location of the individual tags on the rotatable member is such that the information on each tag is read and sent to the control system just before the controlling means from which the tag was taken must be actuated.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 6 and 7 show as an elevation view and front view, respectively, a rotary hydraulic distributor in accordance with the present invention for distributing both high pressure and low pressure fluid to a plurality of engine valves;

FIGS. 8a, 8b and 8c are basically schematic representations of an engine valve being hydraulically opened using a modified hydraulic control system including the rotary distributor of FIGS. 6 and 7, all in accordance with the present invention;

FIGS. 11-13 are similar to FIG. 10 but showing the engine valves at another point in the engine's cycle;

FIGS. 10a through 13a are schematic diagrams of yet another embodiment of the present invention wherein a pair of control valves including a hydraulic rotary distributor is used for controlling the valve operation of a pair of engine cylinders and wherein each distributor alternately controls the functions of both intake valves and exhaust valves, one each in each of the cylinders;

FIG. 14 is a schematic representation of the engine valves and control valve system therefor of a pair of engine cylinders as shown in FIGS. 10a-13a.

BEST MODE FOR CARRYING OUT THE INVENTION

The present invention provides variable control of engine valve timing, lift and velocity. The system exploits elastic properties of compressed hydraulic fluid which, acting as a liquid spring, accelerates and decelerates the valve during its opening and closing motions. During acceleration, some of the potential energy of the fluid is converted into kinetic energy of the valve. During deceleration, the energy of the valve motion is returned to the fluid. With the exception of leakage, most of the energy of the fluid is conserved.

Figure 1:
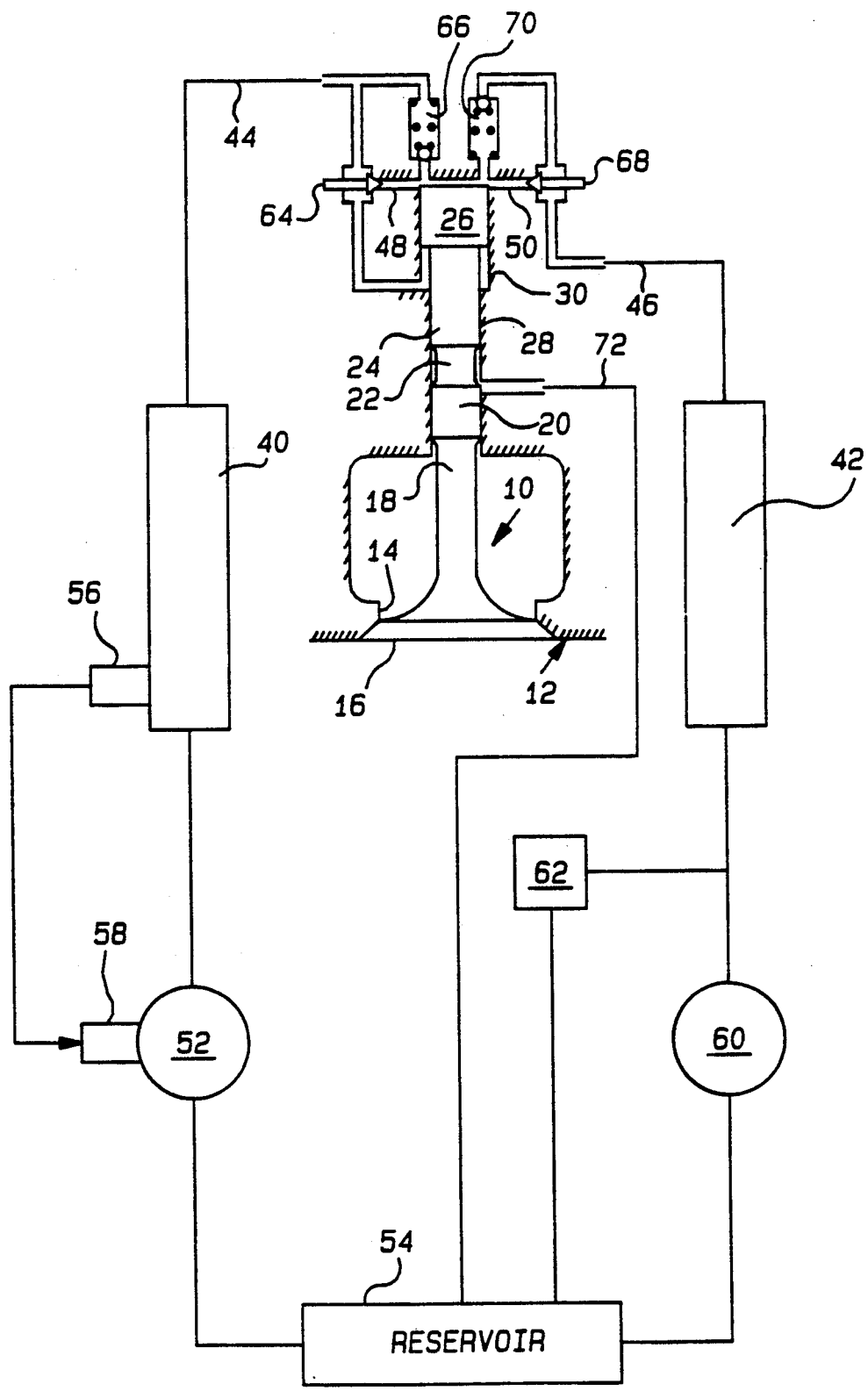
FIG. 1 is a schematic diagram showing a single hydraulically controlled engine valve and the entire hydraulic system for supplying fluid to the valve controlling means according to the invention.

The basic features of the present invention are shown in FIG. 1. An engine valve 10 is located within a cylinder head 12 which includes a port 14 for inlet air or exhaust, as the case may be. Valve 10 includes a valve head 16 and a stem portion 18. Valve stem portion 18 includes a series of concentric cylindrical sections 20, 22, 24 and 26 of varying outer diameter. The sections 20 and 24 guide the valve for reciprocation within guide bore 28. Section 26 constitutes a valve piston slidable within the limits of piston chamber 30 which is concentric with guide bore 28 and also constitutes a part of the cylinder head.

Fluid is selectively supplied to the piston 26 from a high pressure rail 40 and a low pressure rail 42 hydraulically connected through lines 44 and 46, respectively, to high pressure port 48 and low pressure port 50, respectively.

Hydraulic systems maintaining necessary fluid pressures in the high and low pressure rails can be arranged in a variety of ways. The arrangement as illustrated in FIG. 1 includes a variable displacement pump 52 between a reservoir 54 and the high pressure rail. Since the fluid in the high pressure rail is subject only to expansion and contraction, the pumping work of the pump is largely limited to that necessary to compensate for internal leakage through clearances. The variable displacement pump 52 may be under automatic control whereby a pressure sensor 56 will produce a pressure feedback signal to a pump controller 58 in the event pressure in the high pressure rail drops below the set minimum required at any particular vehicle speed or other operating condition. This then varies the pump displacement to maintain the required pressure in the high pressure rail. Fluid in the low pressure rail 42 is maintained at a fixed low pressure by means of pressure pump 60 supplying fluid from reservoir 54 and pressure regulator 62.

The volume above the piston 26 can be connected to the high pressure rail through a solenoid valve 64 or a check valve 66, or to the low pressure rail through solenoid valve 68 or a check valve 70. The volume below the piston 26 is always connected to the high pressure rail. Fluid return line 72 completes the system and provides the means for returning to the reservoir 54 any fluid which leaks past the piston 26 at either end to the chamber formed between guide bore 28 and the reduced diameter section 22 of the valve.

The process of a single valve 10 opening and closing is illustrated in FIGS. 2a-c and 3a-c. The arrows indicate the direction of fluid flow and valve motion as the case may be.

Figure 2C:
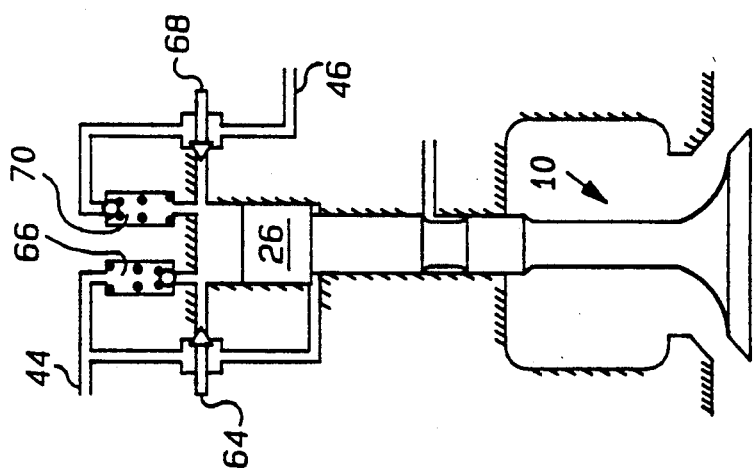
FIGS. 2a, 2b and 2c are elevation views showing a single engine valve and associated valve controlling means, with the valve being shown in three different stages of its being fully opened.
Figure 2B:
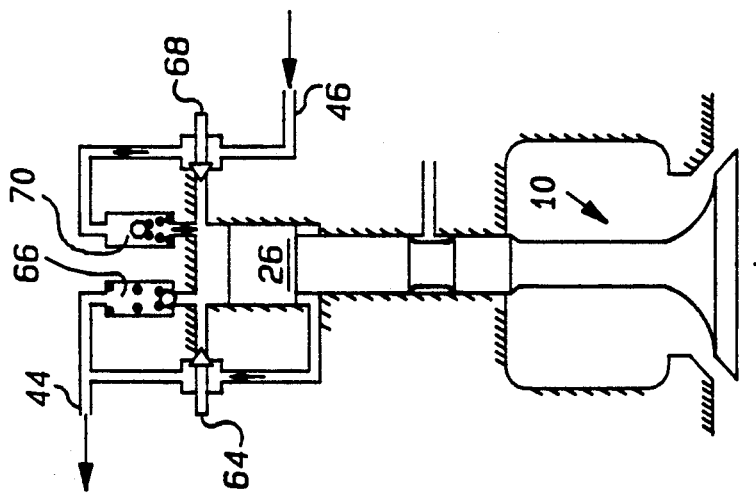
Figure 2A:
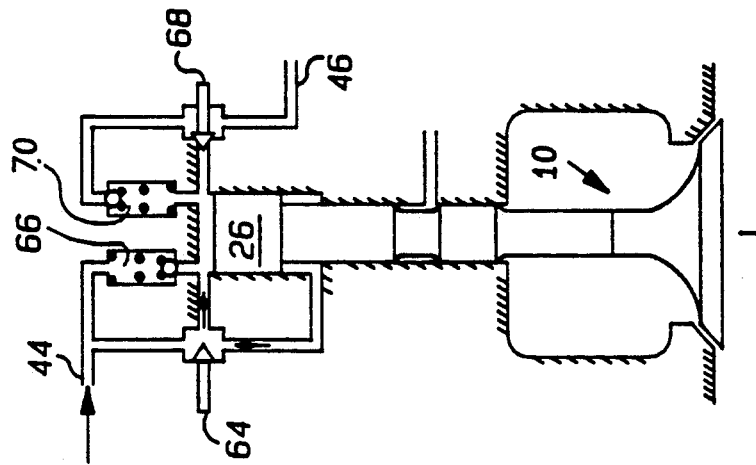

During the engine valve opening, the solenoid valve 64 opens and the net pressure force acting on the piston 26 accelerates the engine valve downward (FIG. 2a). When the solenoid valve 64 closes, pressure above the piston 26 drops, and the piston decelerates pushing the fluid from the volume below it back into the high pressure rail (FIG. 2b). Low pressure fluid flowing through the check valve 70 prevents void formation in the volume above the piston 26 during deceleration. When the downward motion of the valve stops, the low pressure check valve 70 closes and the engine valve remains locked in its open position (FIG. 2c).

Figure 3C:
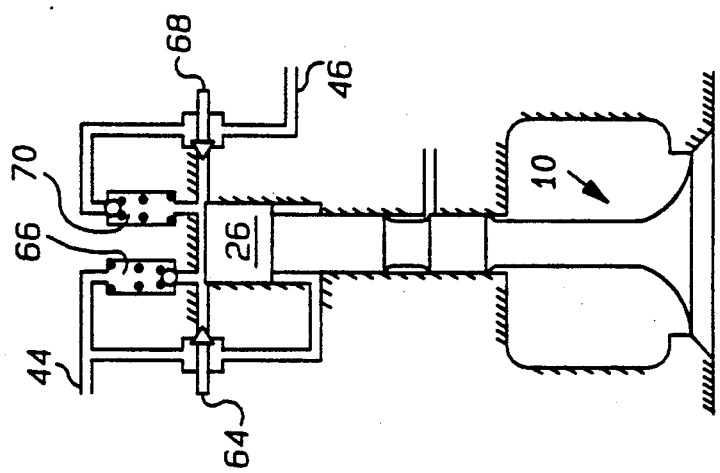
FIGS. 3a, 3b and 3c are elevation views showing a single engine valve and associated valve controlling means, with the valve being shown in three different stages of its being fully closed.
Figure 3B:
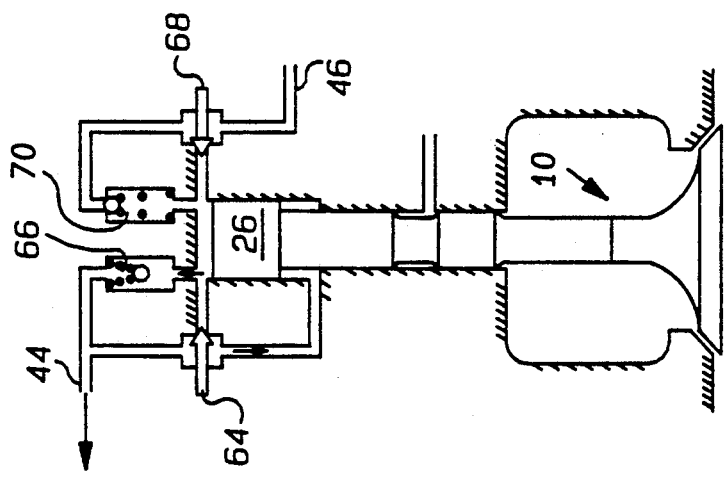
Figure 3A:
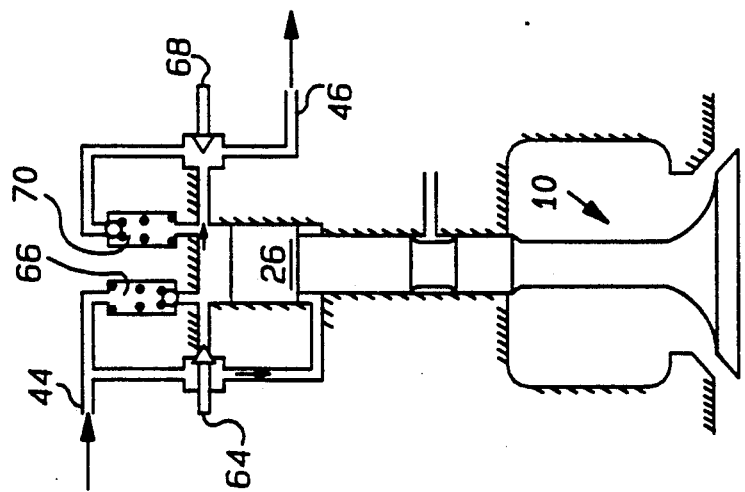

The process of engine valve closing is similar, in principle, to that of the valve opening. The solenoid valve 68 opens, pressure above the piston 26 drops and the net pressure force accelerates the engine valve upward (FIG. 3a). Then the solenoid valve 68 closes and the rising pressure above the piston 26 opens the high pressure check valve 66 (FIG. 3b). The direction of the net pressure force is reversed, and the engine valve decelerates pushing the fluid from the volume above the piston 26 back into the high pressure rail. When the engine valve exhausts its kinetic energy, the high pressure check valve 66 closes and the engine valve remains locked in its closed position (FIG. 3c). A brief reopening of the low pressure solenoid valve 68 assures that the engine valve is firmly pressed against its seat.

Varying the timing of activation of the two solenoid valves varies the timing of the engine valve opening and closing. Valve lift can be controlled by varying the duration of the solenoid voltage pulse. Changing fluid pressure in the high pressure rail permits control of valve acceleration, velocity and travel time. All this permits considerably greater flexibility in engine valve operation control than is possible in conventional cam driven valve trains; flexibility which, in effect, is equivalent to ability to vary the size and the shape of the cam while the engine is running.

Figure 4:
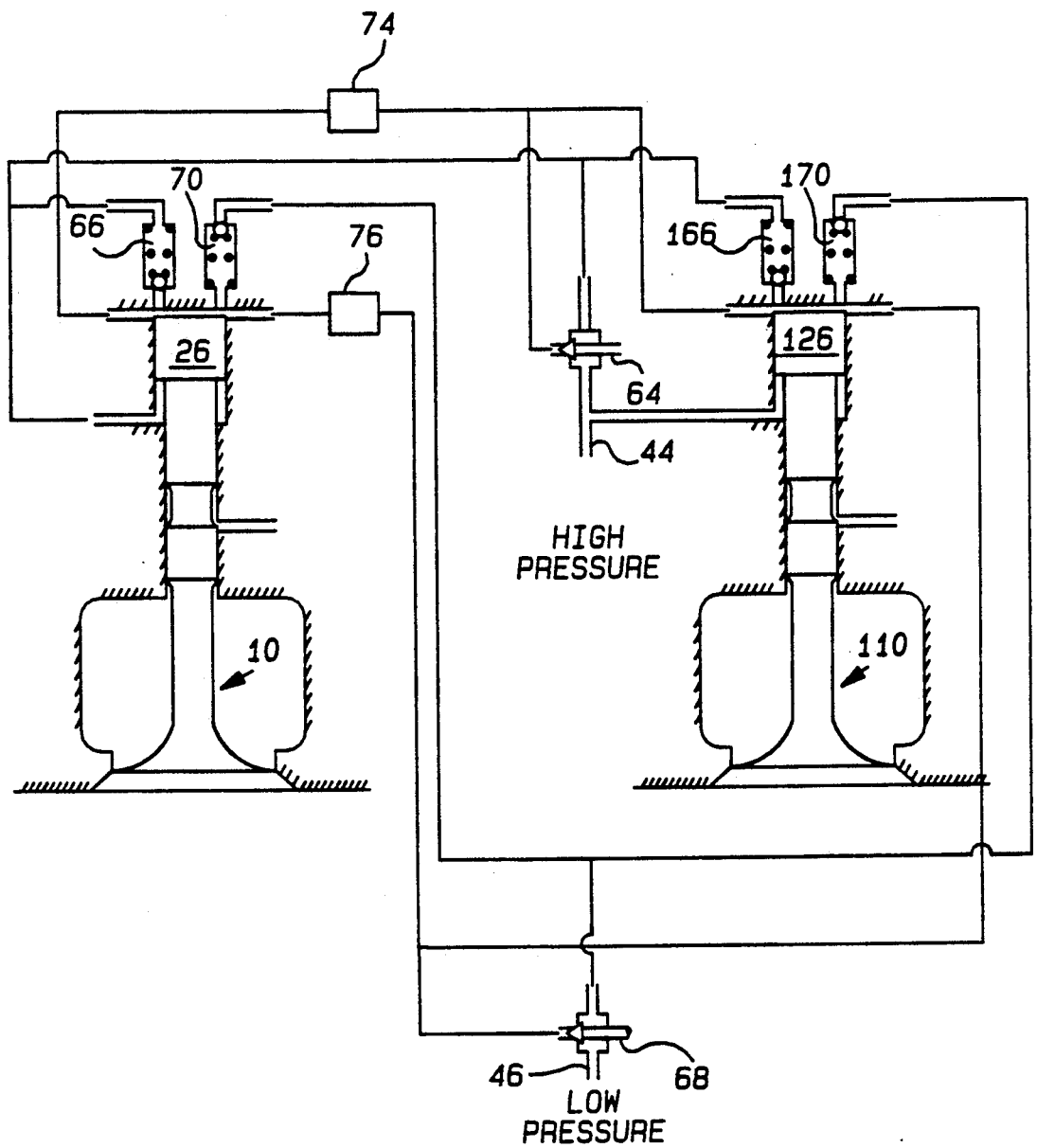
FIG. 4 is a schematic diagram showing an alternative embodiment of the present invention wherein a single pair of control valves is used to control the operation of two valves associated with the same engine cylinder, thereby allowing the single engine valve to be functional or both valves to be functional through selective activation of the two control valves of the system.

In engines with more than two valves per cylinder, a single pair of solenoid valves can activate several intake (or exhaust) valves simultaneously. This is shown in FIG. 4 where the high pressure and low pressure solenoid valves 64 and 68, respectively, activate two engine valves 10 and 110 when the control valves 74 and 76 are open. If the control valves 74 and 76 are closed, only the engine valve 110 is activated. The manner of operation of each engine valve 10,110 is otherwise as described above with reference to FIGS. 1-3. Like reference numerals are used to illustrate this structural identity except with the second engine valve 110, components identical to the first valve 10 are prefixed in the "100" series.

Figure 5:
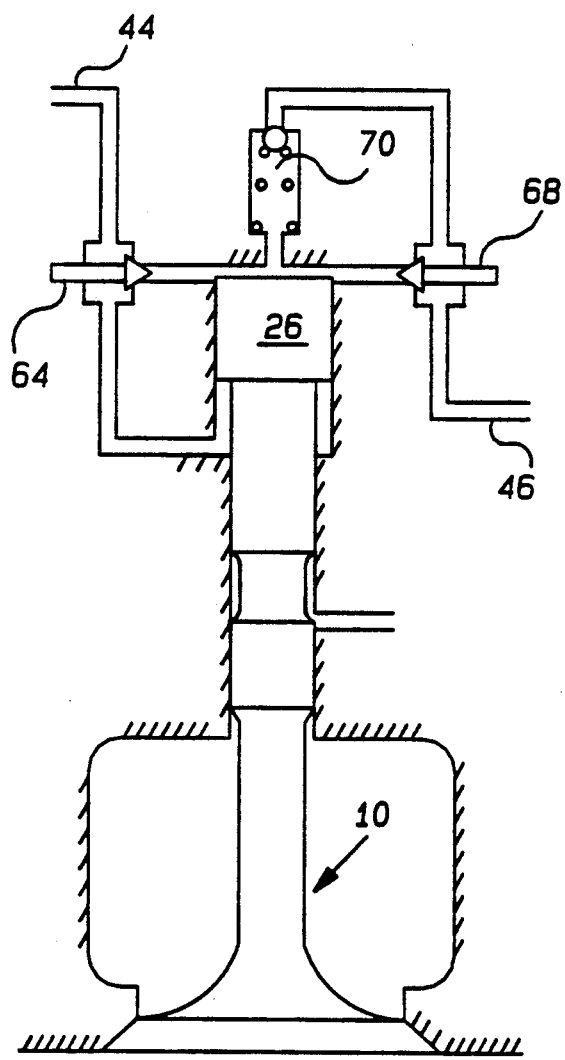
FIG. 5 is an alternate embodiment of the present invention and showing an elevation view of a engine valve and its control means utilizing a single spring bias pressure relief valve and a double acting high pressure rail solenoid valve.

In FIG. 5, there is shown another embodiment wherein the high pressure line 44 to the piston 26 includes only a single check valve 70. The high pressure check valve 66 from FIGS. 1-4 is eliminated. Otherwise, structurally, the system is the same as shown in the embodiments of FIGS. 1-4.

In operation, solenoid valve 64 is actuated twice during each valve cycle, rather than once as previously described, since its actuation must duplicate the functioning of the eliminated check valve 68. Specifically, during the closing stroke, to effect deceleration of engine valve 10 (FIG. 3b of the previous embodiment), the solenoid valve 64 is opened to allow fluid to be pushed back into the high pressure rail. At a point in time when the kinetic energy of the engine valve is calculated to be expended, the solenoid valve 64 is closed and the engine valve remains locked in position.

In the arrangements shown in FIGS. 6-15, there is provided a system whereby the two solenoid valves 64 and 68 control the operation of a group of two or more engine valves. One of the solenoid valves 64 controls the opening motion of the engine valves while the other one 68 is dedicated to control of the closing motion, as previously described. During each cycle of a solenoid valve opening and closing one of the engine valves is brought into motion, in much the same manner previously described in regard to FIGS. 1-4.

One of the key components of the system is a pair of rotary hydraulic distributors each coupled with a respective solenoid valve 64,68. An example of the rotary hydraulic distributor, generally designated 200, is illustrated in FIGS. 6 and 7. A normally closed solenoid valve 64 separates the inside of a rotatable distributor sleeve 210 from the source of pressurized fluid, namely for purposes of this discussion, the high pressure rail 40. The distributor sleeve 210 can rotate within an outside stationary sleeve 212, which has several equally radially spaced ports 214 about its circumference, each connected to a separate outlet line 48a-d. The distributor sleeve 210 has a single radial passage 218 which, during each revolution, connects the inside of the distributor sleeve with each of the outlet ports 214 in succession. During engine operation, the distributor sleeve rotates with half the crankshaft speed, and the solenoid valve is opened each time the radial passage 218 is in register with one of the ports 214. The timing and duration of solenoid valve opening may vary within the window of the passage 218 and each port 214 registration.

During the valve opening, the high pressure solenoid valve 64 is connected to the engine valve through its rotary distributor. The solenoid valve 64 opens and the net pressure force acting on the piston 26 accelerates the engine valve 10 downward (FIG. 8a). When the solenoid valve 64 closes, pressure above the piston 26 drops, and the piston decelerates pushing the fluid from the volume below it back into the high pressure rail (FIG. 8b). Low pressure fluid flowing through the check valve 70 prevents void formation in the volume above the piston 26 during deceleration. When the downward motion of the valve stops, the check valve 70 closes and the engine valve remains locked in its open position (FIG. 8c). During the opening period, the action at the solenoid valve 68 has no effect on this engine valve, since there is no connection between them through the rotary hydraulic distributor 200 of the solenoid valve 68.

Figure 9C:
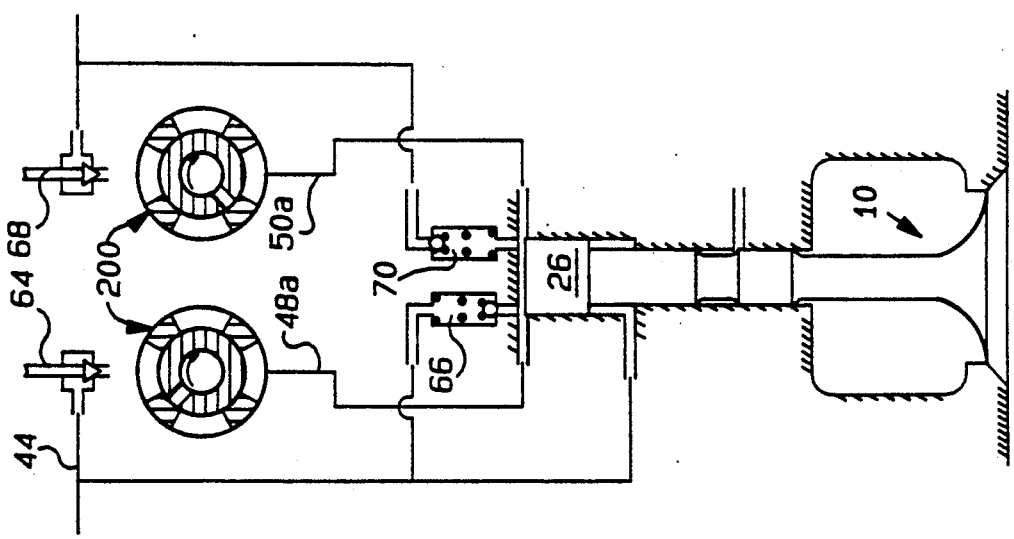
FIGS. 9a, 9b and 9c show schematic representations of an engine valve being hydraulically closed using a modified hydraulic control system including the rotary distributor of FIGS. 6 and 7, all in accordance with the present invention.
Figure 9B:
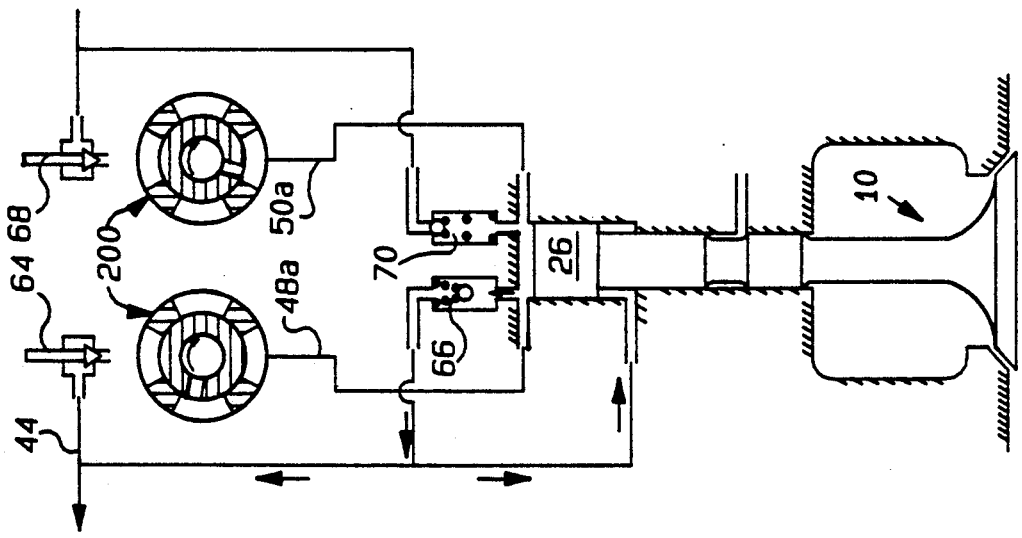
Figure 9A:
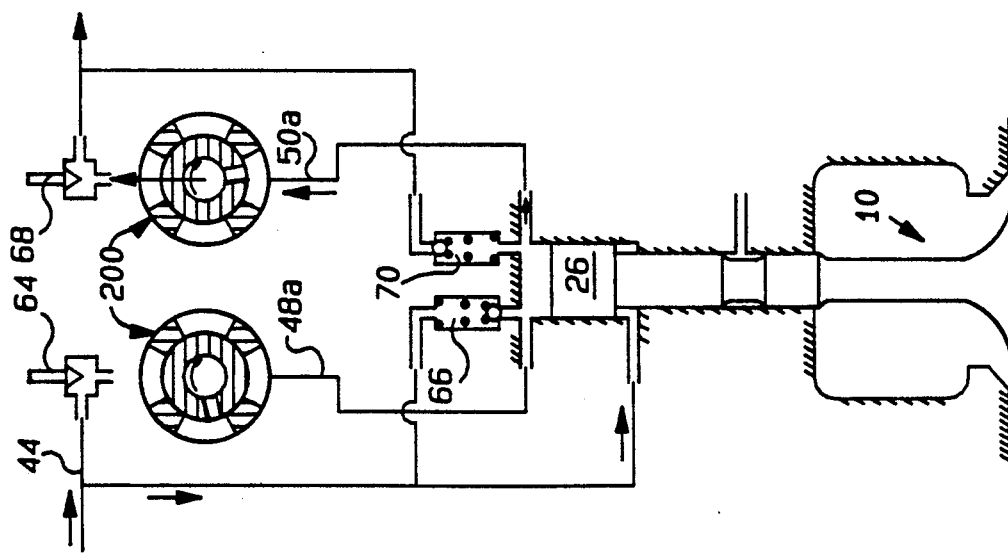

The process of valve closing is similar, in principle, to that of the valve opening. This time, it is the low pressure solenoid valve 68 which is connected to the engine valve through its rotary distributor, while the high pressure solenoid valve 66 is disconnected. The low pressure solenoid valve 68 opens, pressure above the piston 26 drops and the net pressure force accelerates the engine valve upward (FIG. 9a). Then the solenoid valve 68 closes and the rising pressure above the piston 26 opens the check valve 66 (FIG. 9b). The direction of the net pressure force is reversed, and the engine valve decelerates pushing the fluid from the volume above the piston 26 through line 44 and back into the high pressure rail 40. When the engine valve exhausts its kinetic energy, the check valve 66 closes and the engine valve remains locked in its closed position (FIG. 9c) Proper selection of solenoid valve 68 opening duration is, of course, to be determined to assure proper engine valve closing.

As with the previously described embodiment, varying the (i) timing of activation of the two solenoid valves varies the timing of the engine valve opening and closing, (ii) duration of the solenoid voltage pulse controls valve lift, and (iii) fluid pressure in the high pressure rail permits control of valve acceleration, velocity and travel time. Again, the advantage incurred is greater flexibility in engine valve operation control than is possible in conventional cam driven valve trains.

The previous description, which was illustrated in FIGS. 8a-c and 9a-c was limited to a case of a single valve operation. FIGS. 10-13 illustrate a case in which a pair of solenoid valves with rotary hydraulic distributors successively operate four valves in four engine cylinders, namely either four intake valves or four exhaust valves. Taken together, FIGS. 10-13 depict a series of events taking place during a single 720° engine cycle and separate from each other by 90° of rotary distributor angle (180° crankshaft angle). The engine firing order is cylinder nos. 1-3-2-4.

Figure 10:
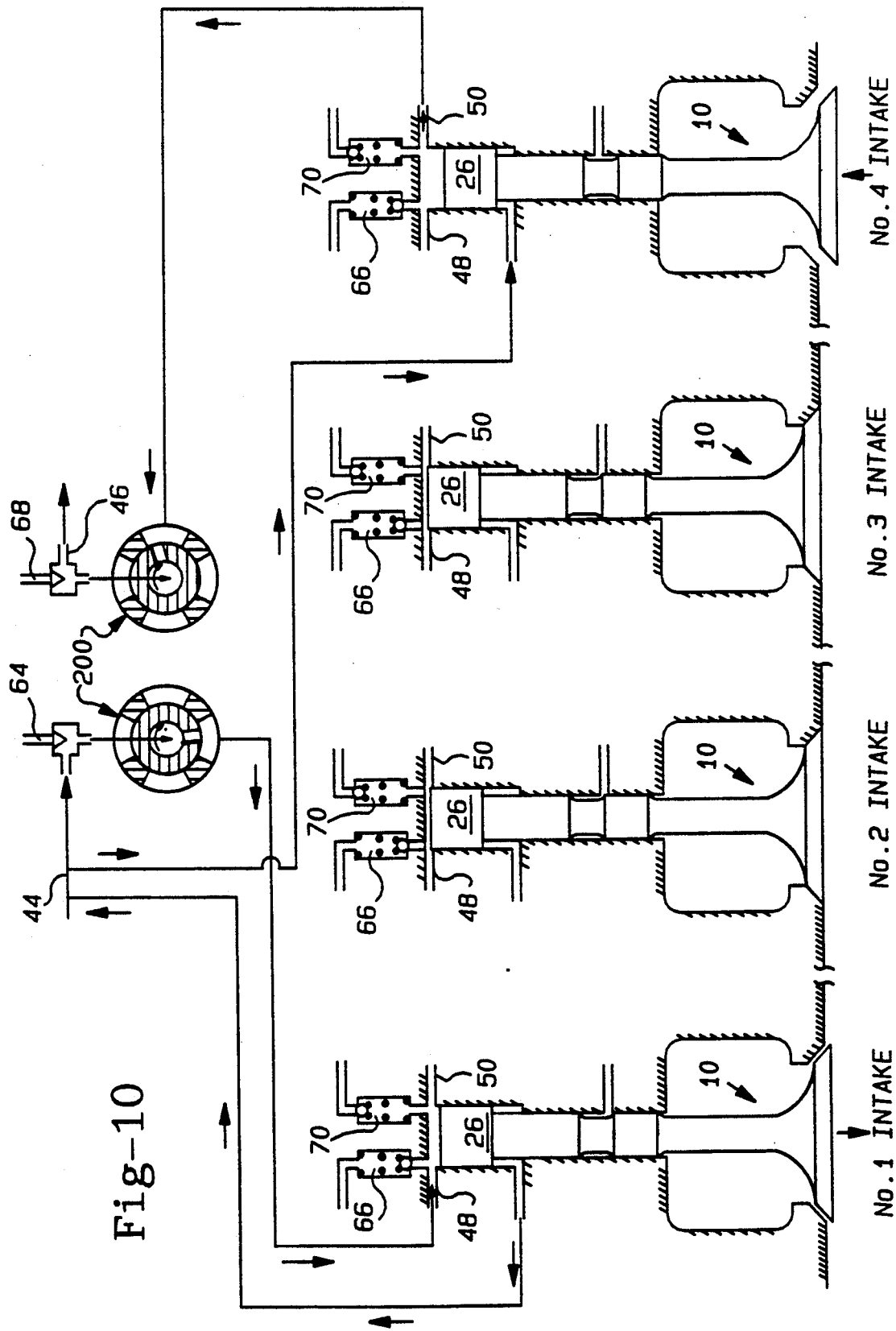
FIG. 10 is a schematic diagram of an alternative embodiment of the present invention wherein the control means including the rotary hydraulic distributor is used to control a plurality of engine valves, one each for each of the engine cylinders and all the other intake valves or exhaust valves.

In FIG. 10, the high pressure solenoid valve 64 is open and the engine valve No. 1 is accelerated toward opening. The low pressure solenoid valve 68 is open also and engine valve No. 4 accelerates while moving toward its closed position. Only lines in which fluid motion takes place are shown in the drawing.

Figure 11:
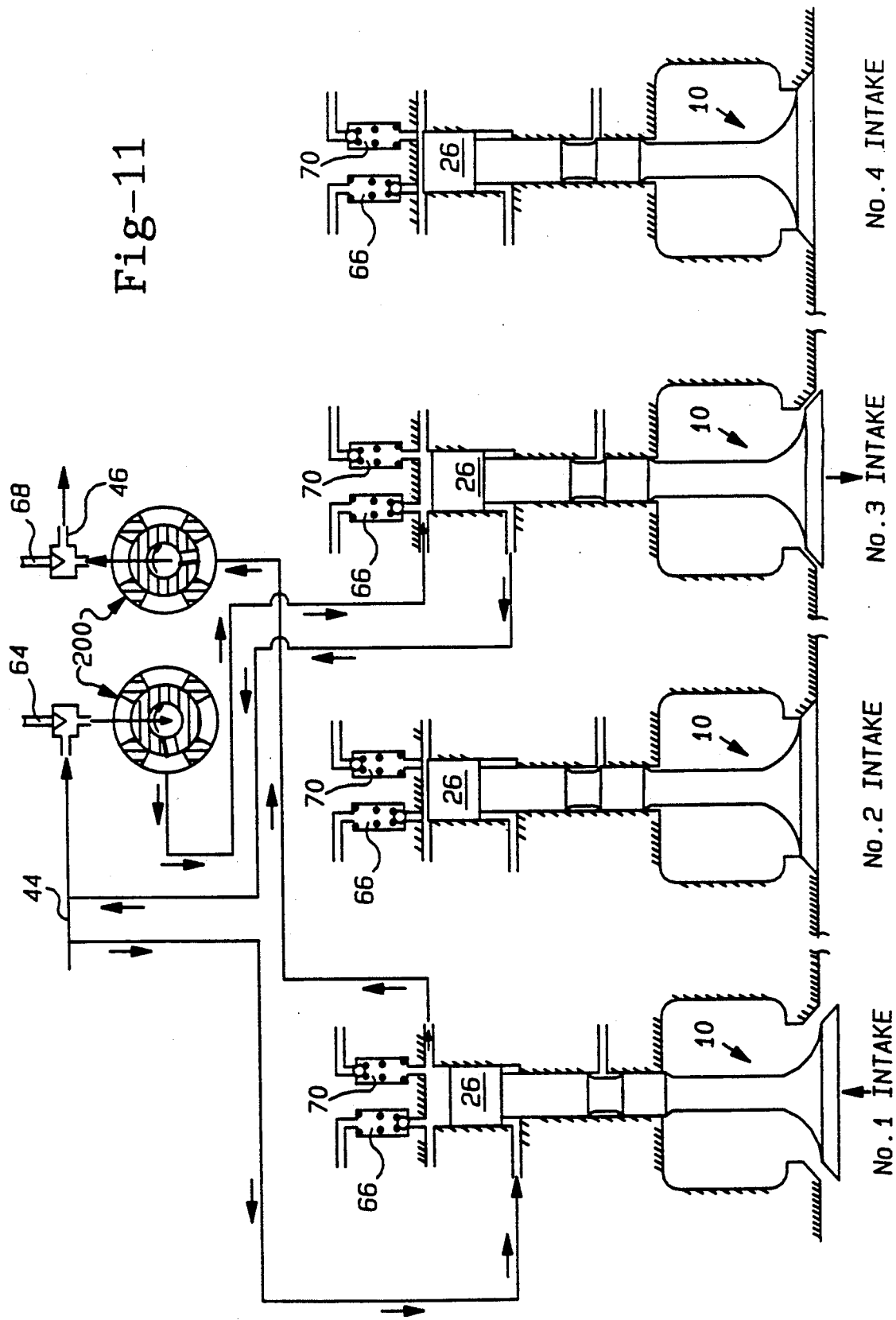

In FIG. 11, the solenoid valves 64 and 68 are open again, but, due to new positions of their rotary distributors 200, this time it is valve No. 3 which moves toward opening, while valve No. 1 is closing.

Figure 13:
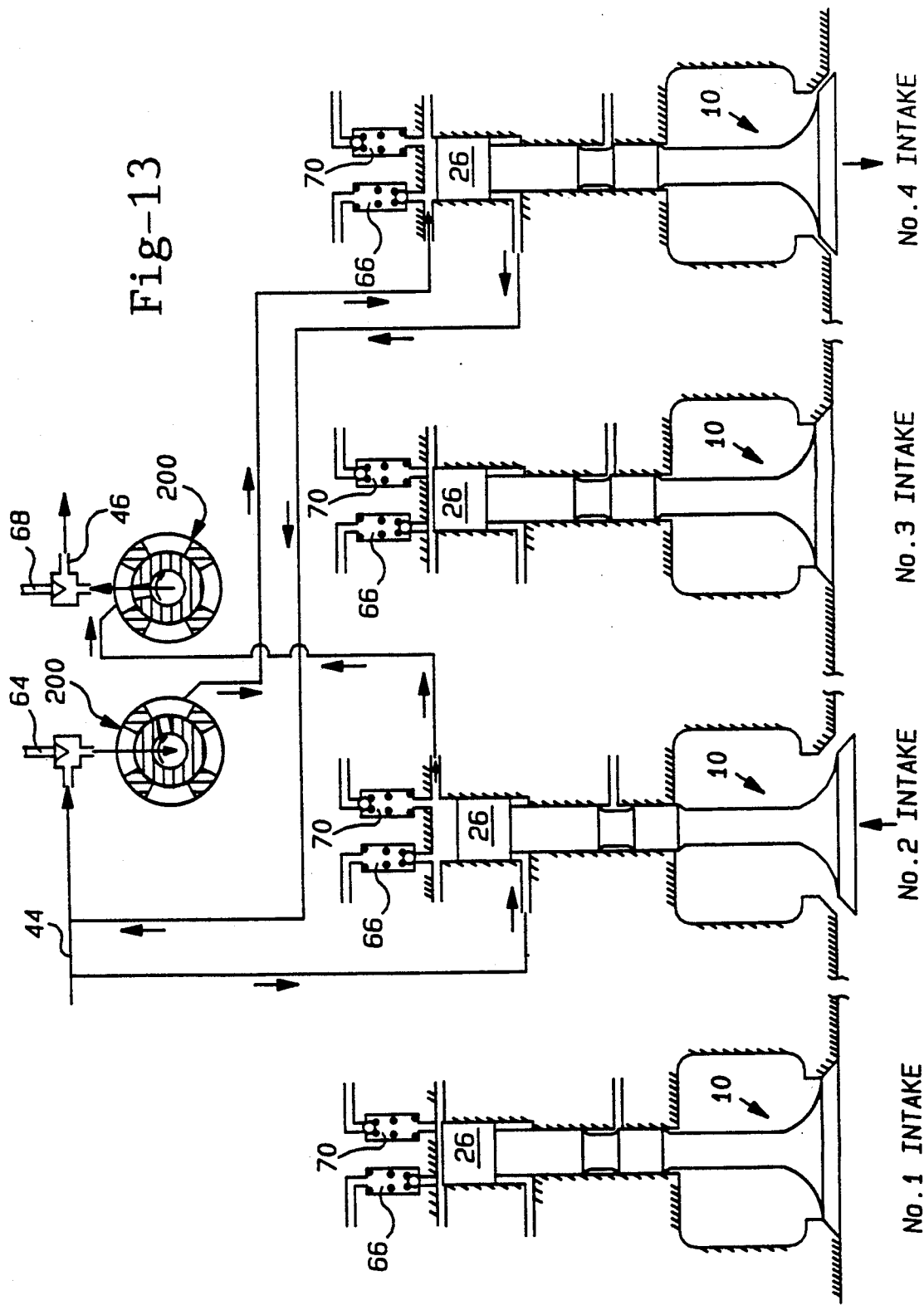

In FIG. 12, the position of rotary distributors 200 is such that valve No. 2 is opening while valve No. 3 is closing, and in FIG. 13 valve No. 4 is opening while valve No. 2 is closing. After that, the entire sequence is repeated again during each engine cycle.

As mentioned, the engine valves shown in FIGS. 10-13 could be four intake valves or four exhaust valves in four engine cylinders. However, they could also be one intake and one exhaust valve in one cylinder and another pair of intake and exhaust valves in another cylinder which is 360° crankshaft out of phase with the first one (for example, cylinders No. 1 and 2). In that case, the operational order would be: No. 1 exhaust, No. 1 intake, No 2 exhaust, No. 2 intake. This is illustrated in FIGS. 10a-13a. As it was the case in FIGS. 10-13, the solenoid valves 64 and 68 are open in every case but, in each case, the rotary distributors 200 connect the solenoid valves to a different pair of engine valves. In FIG. 10a, the No. 1 exhaust valve accelerates toward opening and the No. 2 intake valve accelerates toward closing. In FIGS. 11a, the No. 1 intake valve accelerates toward opening, and the No. 1 exhaust valve accelerates toward closing. In FIG. 12a, the No. 2 exhaust valve accelerates toward opening, and the No. 1 intake valve accelerates toward closing. In FIG. 13a, the No. 2 intake valve accelerates toward opening, and the No. 2 exhaust valve accelerates toward closing. In a similar manner, the valves in cylinders No. 3 and 4 can be controlled. The operational order would be: No. 4 intake, No. 3 exhaust, No. 3 intake, No. 4 exhaust.

Figure 14:
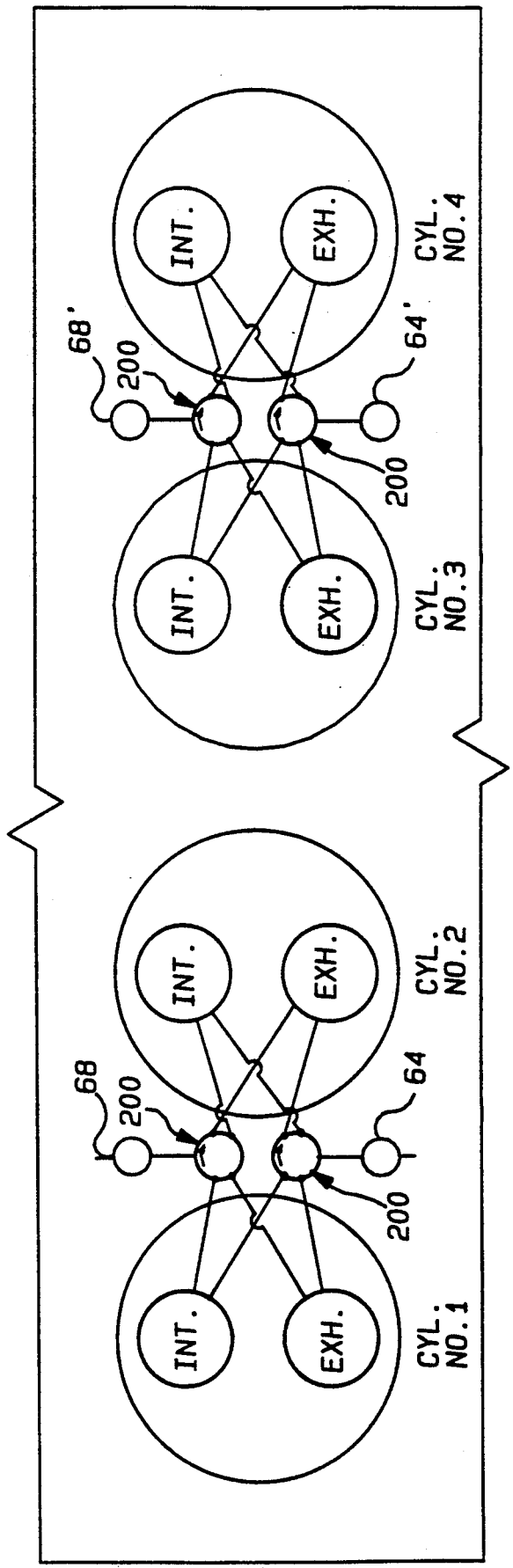
Figure 15:
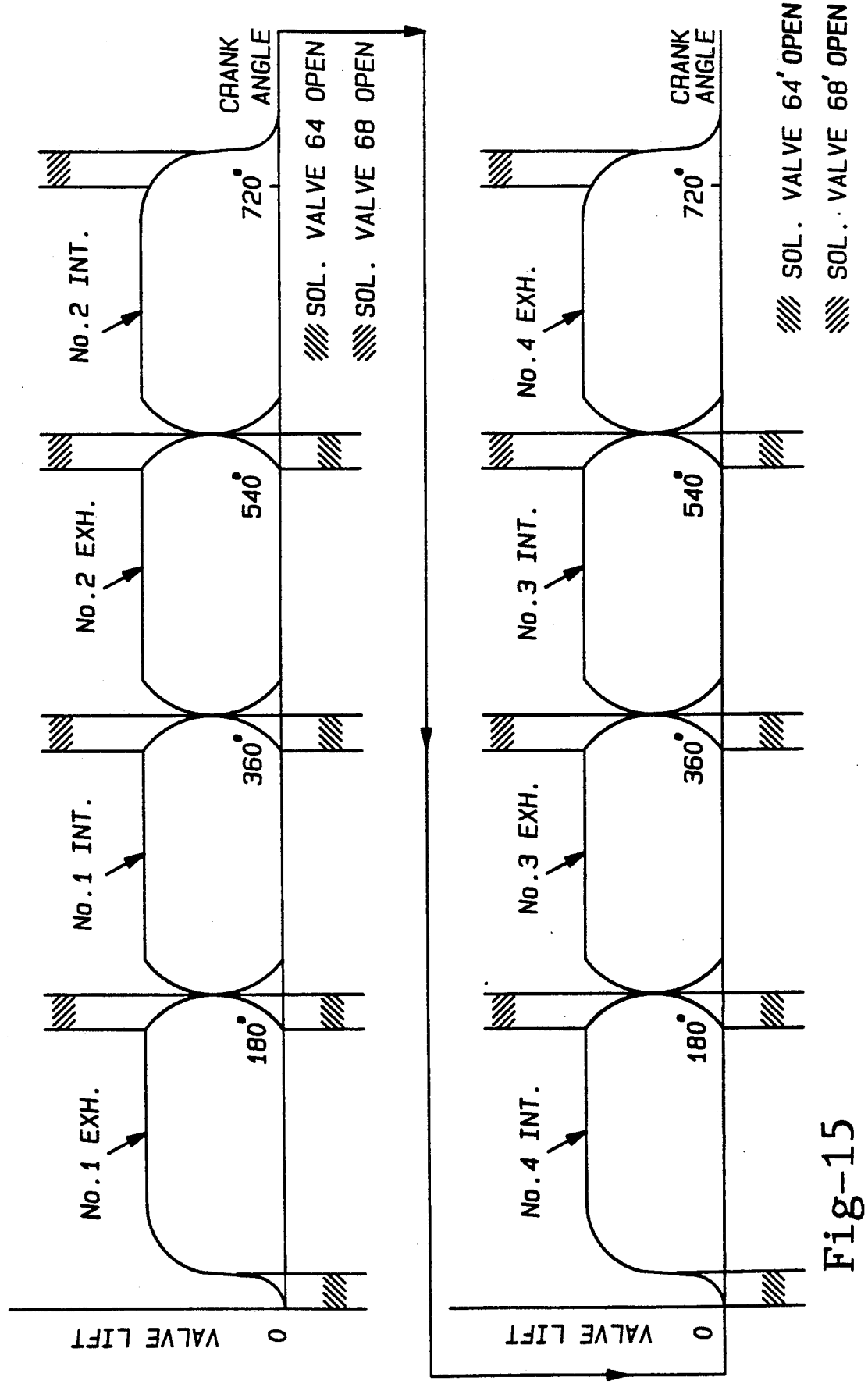
FIG. 15 is a schematic valve lift diagram showing the valve lift pattern for the system shown in FIG. 14.

FIG. 14 is a schematic diagram of hydraulic connections between the solenoid valves with their rotary hydraulic distributors and the engine valves they control as discussed above and illustrated in FIGS. 10a-13a. Solenoid valves 64 and 68 control the intake and exhaust engine valves in cylinders No. 1 and No. 2, and another pair of solenoid valves, 64' and 68', identical to valves 64 and 68, control the intake and exhaust engine valves in cylinders No. 3 and No. 4. FIG. 15 shows an example of valve lift profiles in the four cylinder engine valve control system depicted in FIG. 14.

The system of solenoid valves coupled with rotary hydraulic distributors was described above as applied to a specific concept of variable valve control. It is clear, however, that application of such a system is not limited to any specific concept and can be applied to many other variable valve control systems in which solenoid valves are used to control the engine valves motion.

Figure 16:
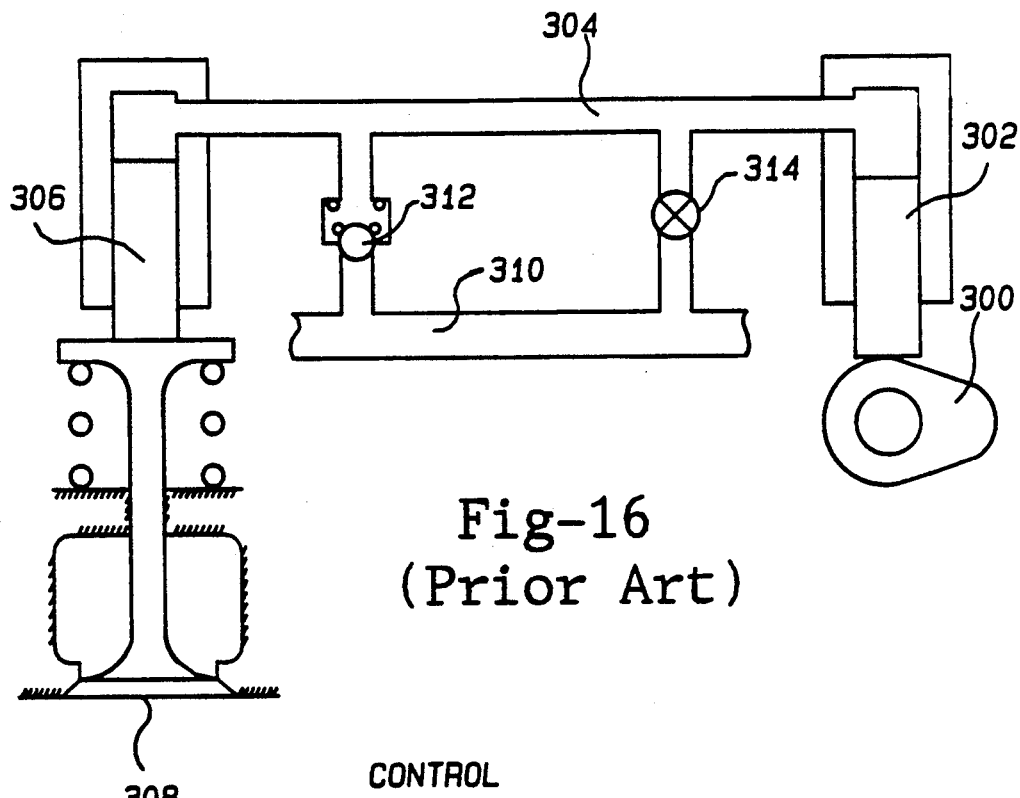
FIG. 16 is a schematic diagram of a conventional lost motion type, cam-operated, hydraulic engine valve control system.

Valve motion control by means of solenoid type control valves is also used in variable valve systems known as "lost motion" systems. An example of a lost motion valve control system is diagrammatically shown in FIG. 16. It is a well known system and as such forms no part of this invention.

A cam 300 drives a cam plunger 302. The motion of the plunger 302 is transmitted through fluid filling a passage 304 to a valve plunger 306 driving the valve 308. Fluid leaking out of the system is replenished from a supply gallery 310 through a check valve 312. As long as the solenoid valve 314 remains closed, the motion of the valve 308 is determined by the profile of the cam 300. Opening the solenoid valve 314 permits some of the fluid to escape from the passage 304 into the supply gallery 310. As a result, motion of the valve 308 becomes different from that dictated by the profile of the cam 300. By varying the solenoid voltage pulse timing and duration, various shapes of the valve lift versus time curve can be obtained.

One of the most important advantages of the variable valve control is the ability to control the amount of air inducted into the engine cylinders by controlling the valve operation rather than by means of throttling the air flow. This permits elimination of a substantial portion of engine throttling losses and improvement in the fuel efficiency. In addition to improved fuel efficiency, skillful application of variable valve control can lead to improvements in combustion stability, maximum power and exhaust emissions. It is important, however, to prevent cylinder-to-cylinder intake air maldistribution. In engines with carburetors or with single point central fuel injection, uneven intake air distribution would lead to unequal power developed by individual cylinders. In engines with multi-point port fuel injection or with direct in-cylinder injection, intake air maldistribution would result in cylinder-to-cylinder variations in air-to-fuel ratios. Such deficiencies can cancel out the benefits of variable valve control.

The amount of air inducted into an engine cylinder is dependent on the engine intake valve lift and opening duration. Therefore, to assure equal air distribution, it is imperative that the valve lift and duration of opening in all cylinders are the same. Since the motion of the valves is controlled by solenoid valves, this amounts to a requirement that all solenoid valves in the system, given the same signal, produce identical results in terms of valve motion.

The accuracy of the cylinder-to-cylinder air distribution is also affected by the accuracy of exhaust valve motion control. Therefore, in variable valve control systems controlling both intake and exhaust valves, similar requirements should be applied to both kinds of valves.

Figure 17:
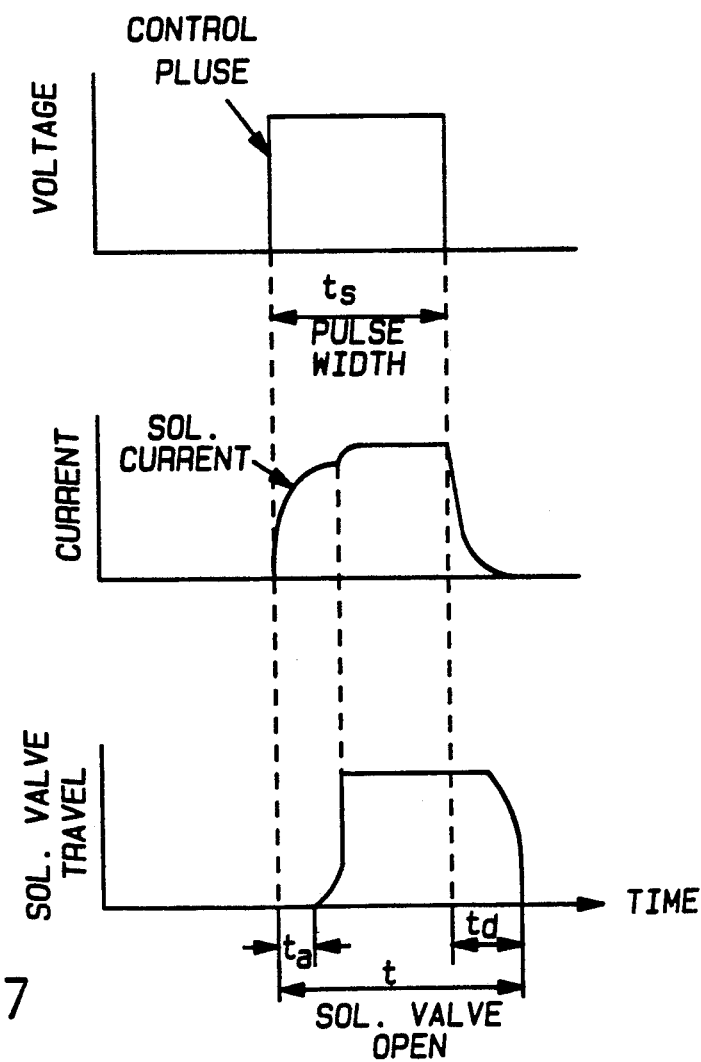
FIG. 17 is a composite graph showing the operating characteristics of a single solenoid valve as a function of time versus solenoid valve travel, current and voltage.

Referring to FIG. 17, the normally closed solenoid valve parameter which determines the engine valve motion is the solenoid valve opening duration t. In systems using normally open solenoid valves it would be the closing duration. It is a function of the solenoid voltage pulse duration $t_s$, but it differs from the latter by solenoid valve activation and deactivation delays, $t_a$ and $t_d$, respectively. This is illustrated in FIG. 17 showing a graph of the solenoid voltage pulse versus time and corresponding graphs of the solenoid current and valve motion versus time. The activation and deactivation delays can vary from solenoid to solenoid due to differences associated with inevitable manufacturing tolerances. As a result, different solenoid valves receiving the same control voltage signal may exhibit different solenoid valve opening durations and, consequently, have different effects on the engine valve motion.

To insure that the engine valve motion of all common valves (intake or exhaust) in all cylinders is identical, the solenoid valve opening duration in each solenoid must be the same. This can be accomplished by modifying the duration of the voltage pulse sent to each individual solenoid, so as to compensate for variations in the activation and deactivation delays. The required correction in control pulse duration can be determined experimentally during solenoid testing and encoded on a tag attached to the solenoid valve. Subsequently, the information on the tag can be read and used by the engine electronic control system.

A conventional calibration device (not part of this invention) may be used to determine the correction required for individual solenoid valves. The device is intended for calibration of high pressure solenoid valves for a system such as illustrated in FIGS. 1-13. The calibration device would be connected to high and low fluid pressure sources. The device would need to include two solenoid valves. One of the two solenoid valves would be a permanent part of the device and have a verified standard characteristic. The other solenoid valve, e.g. the solenoid valve 64 shown in FIG. 1, would be the one subject to testing.

During the test, both the solenoid valves in the calibration device are activated by voltage signals of a pre-determined duration with some frequency, and the stroke of an engine valve forming a part of the calibration device and preferably identical to the engine valve 10 would be measured by a sensor. If the measured stroke differs from the expected standard one, the duration of the pulse applied to the solenoid valve 64 being calibrated is modified until the stroke of the engine valve corresponds to the required one. The final incremental value of the pulse duration added to or subtracted from the initial pre-determined duration can be called the correction number of the solenoid valve. Different solenoid valves may have different correction numbers, but what is important is that if any of them is activated by a voltage pulse consisting of standard pulse duration, to which its individual correction number is added or subtracted, they will all produce the same valve lift. Since the correction number compensates for solenoid-to-solenoid variations in activation and deactivation delays, which do not vary with change in pulse duration and frequency, the correction determined under one set of conditions remains valid for any pulse duration and frequency.

Figure 18:
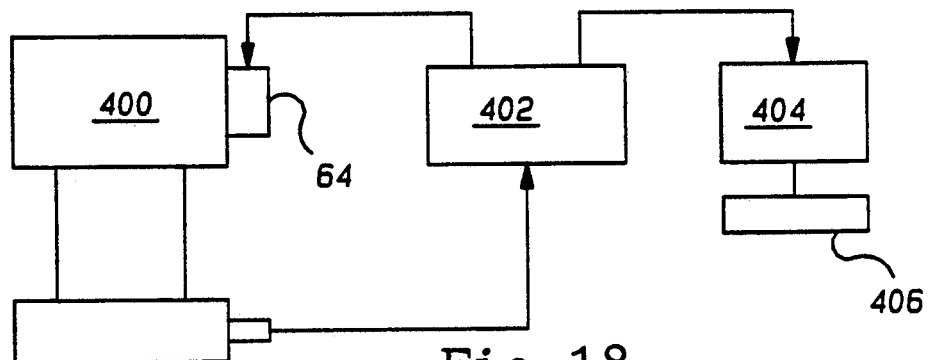
FIG. 18 is a schematic diagram of yet another embodiment of the present invention wherein each solenoid valve used in the above-mentioned systems can be calibrated to allow adjusting the current input to the solenoid valve to produce an identical valve stroke for all of the variably hydraulically controlled valves in a system in accordance with the present invention as equipped with different solenoids.

FIG. 18 shows a diagram of a solenoid valve calibration system which includes the above described calibration device and individually calibrates at least each high pressure solenoid valve 64 to be used in the variable engine valve control system of this invention. The calibration device 400 is operated and controlled by an electronic controller 402 programmed to send out an initial standard solenoid control pulse, to receive and interpret the valve stroke signal, and to modify the duration of the control signal until the required valve stroke is achieved. When this is accomplished, the controller activates a printer 404 which prints and issues a tag 406 with the solenoid valve correction number expressed in the form of a binary bar code. The tag 406 can be glued or otherwise attached to the solenoid valve. When each solenoid valve 64 is installed on the engine, its tag is disattached from it and glued or otherwise attached to a rotatable member as described below which rotates with half the crankshaft speed during engine operation (in case of a two-stroke engine, this would be equal to crankshaft speed). The location of each tag on the rotating member depends on which cylinder its solenoid valve is installed.

Figure 19:
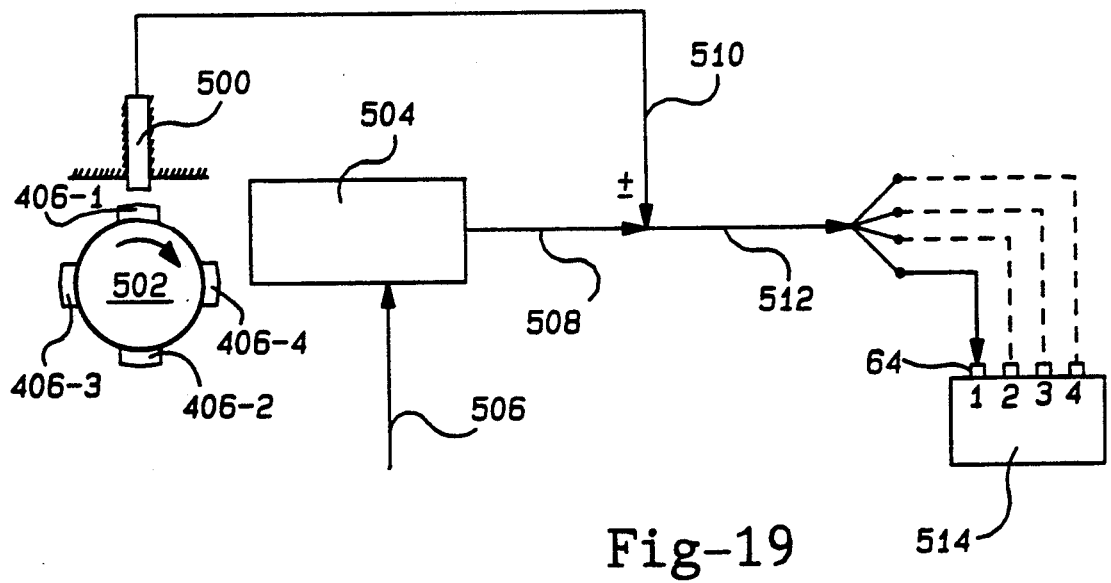
FIG. 19 is a schematic diagram of a control system utilizing a plurality of calibrated solenoid valves and adjusting the valve opening characteristics in each of the cylinders of the internal combustion engine in accordance with the present invention.

As shown diagrammatically in FIG. 19, a sensor is installed in proximity of a rotating member 502 and reads the bar code on each tag 406 as it passes by the sensor and sends this information to the engine electronic control system 504. The relative location of all the tags 406 on the rotating member is such that the engine control system successively receives information encoded in each tag just before its solenoid is to be actuated. The duration of the basic control signal computed for all solenoid valves controlling all engine intake (or exhaust) valves is determined by the control system as a function of engine operating parameters designated generally as input line 506, such as speed, load, etc. and is common to all intake (or exhaust) valves. The basic signal 508 is modified by addition or subtraction of the most recently received value of correction signal 510 and the corrected signal 512 is then relayed to the appropriate control solenoid valve 64, for example at cylinder No. 1 of engine 514 as shown, for that particular engine valve operation. Thus, tag 406-1 corrects the solenoid valve 64 at cylinder No. 1, as does tag 406-2 at cylinder 2, and so on. Therefore, each solenoid valve receives its own individualized corrected control signal which compensates for solenoid-to-solenoid differences and assures that at a given value of the basic control signal all engine intake (or exhaust) valves will perform in an identical manner.

The above described method of determining correction required for individual solenoid valves is not limited to the system illustrated in FIGS. 10–13. It is fully applicable to a variety of other systems. In each case the tested solenoid valve is installed in a calibration device representing a variably controlled single engine valve and run with a predetermined pulse which is subsequently modified until the required standard pattern of valve motion is achieved. The method is applicable to the lost motion system and numerous other systems.

While the best mode for carrying out the invention has been described in detail, those familiar with the art to which this invention relates will recognize various alternative designs and embodiments for practicing the invention as defined by the following claims.

I claim:

1. A hydraulically operated valve control system for an internal combustion engine, said system comprising:
    a high pressure source of fluid and a low pressure source of fluid;
    a cylinder head member adapted to be affixed to the engine and including an enclosed cavity;
    a poppet valve shiftable between a first and second position within said cylinder head member;
    a hydraulic actuator including a piston coupled to the poppet valve and reciprocable within the enclosed cavity which thereby varies in displacement as the poppet valve moves;
    said cylinder head member having a high pressure port extending between the enclosed cavity and the high pressure source of fluid and a low pressure port extending between the enclosed cavity and the low pressure source of fluid;
    a high pressure valve and a low pressure valve for respectively regulating the flow of fluid in the high pressure and the low pressure ports; and
    control means cooperating with the high and low pressure valves for selectively coupling the enclosed cavity to the high pressure and low pressure sources to oscillate the poppet valve in timed relation to engine operation, wherein during each oscillation, some of the high pressure fluid used to reciprocate the poppet valve is returned to the high pressure source, thereby allowing that the net fluid flow between the high pressure and low pressure sources may be substantially less than the volume swept by the piston.

2. The system of claim 1 wherein the area subject to fluid pressure on one side of the said piston is larger than the area subjected to fluid pressure on the other side of the piston;
    said poppet valve accelerating in the direction of poppet valve opening when the control means opens the high pressure valve and decelerating when the high pressure valve closes;
    said poppet valve accelerating in the direction of poppet valve closing when the control means opens the low pressure valve and decelerating when the low pressure valve closes;
    the timing of the high pressure valve opening controlling the timing of the poppet valve opening, and the timing of the low pressure valve opening controlling the timing of the poppet valve closing; and
    the duration of the high pressure valve opening controlling the poppet valve stroke.

3. The system of claim 1 wherein the high pressure valve and the low pressure valve are solenoid valves.

4. The system of claim 1 wherein said piston includes a pair of ends exposed to opposite respective ends of the enclosed cavity;
    said high pressure source includes a first high pressure fluid line leading to the enclosed cavity at both ends of the piston;
    said high pressure valve being located within said first high pressure line and operational to open and close fluid flow to one end of said piston;
    the other end of said piston being continuously open to said high pressure fluid source;
    a low pressure fluid line leading to the enclosed cavity at said one end of the piston, the low pressure valve being located within said low pressure line and operational to open and close fluid flow to the one end of the piston; and
    a normally closed pressure relief valve located in the low pressure line intermediate the one end of said piston and the low pressure valve, whereby during the opening and closing of the poppet valve, the potential energy of the fluid from the high pressure fluid source can be utilized to accelerate the poppet valve, thereby increasing the kinetic energy of the poppet valve, and, during deceleration, the kinetic energy of the poppet valve can be utilized to pump the fluid back into the high pressure fluid source, thereby restoring the potential energy of the high pressure fluid.

5. The system of claim 4 wherein said high pressure source includes a second high pressure fluid line hydraulically coupled to said one end of the piston, and a normally closed pressure relief valve located in the second high pressure fluid line.

6. The system of claim 5 including a pair of said poppet valves, each poppet valve including one said hydraulic actuator and a respective one said high pressure relief valve and one said low pressure relief valve;
    said first high pressure fluid line and said low pressure fluid line each being hydraulically coupled to each said poppet valve and hydraulic actuator;
    said control means including a pair of control valves, one each being hydraulically coupled to a respective first high pressure fluid line and low pressure fluid line intermediate the pair of poppet valves whereby when the control valves are open, both poppet valves are operational and when the control valves are closed, only one poppet valve is operational.

7. The system of claim 5 including a plurality of said poppet valves, each poppet valve including one said hydraulic actuator and a respective one said high pressure relief valve and one said low pressure relief valve;
    said control means including a high pressure fluid distributor means interposed between said high pressure valve and each said first high pressure fluid line leading to each said poppet valve and having a separate outlet port to each said first high pressure fluid line, said high pressure fluid line means being selectively controllable in timed sequence to conduct high pressure fluid to any one of said poppet valves when said high pressure valve is open;

said control means further including a low pressure fluid distributor means interposed between said low pressure valve and each said low pressure fluid line leading to each said poppet valve and having a separate outlet port to each said low pressure fluid line, said low pressure fluid line means being selectively controllable in timed sequence to conduct low pressure fluid to any one of said poppet valves when said low pressure valve is open;

whereby a single high pressure valve and a single low pressure valve can be utilized to control the actuation of a plurality of poppet valves to be sequentially operated.

8. The system of claim 7 wherein said high pressure distributor means and said low pressure distributor means each comprise:
   a rotary distributor valve;
   the rotary distributor valve comprising a stationary outer sleeve and a rotatable inner distributor sleeve concentrically arranged within and in sliding engagement with said outer sleeve;
   said inner distributor sleeve having an inlet port at one end and a drive shaft at the opposite end; and
   said high and low pressure valves being hydraulically coupled to a respective said inlet port to control fluid flow through the rotary distributor valve.

9. The system of claim 1 further including means for converting the potential energy of the fluid into kinetic energy of the reciprocating poppet valve during the poppet valve acceleration and then similarly converting the kinetic energy of the poppet valve into potential energy of the fluid during the poppet valve deceleration.

10. The system of claim 1 wherein the high pressure and the low pressure sources of fluid comprise a respective container filled with pressurized fluid whereby inflow of the fluid into the hydraulic actuator is the result of the fluid expansion from a respective one of the pressurized containers, and outflow of the fluid through said high pressure and low pressure valves increases fluid compression in each respective pressurized container.

11. In an internal combustion engine, an engine valve control system in which the valve stroke is controlled by varying timing and duration of electric signals sent to individually dedicated engine valve controlling means, the system comprising:
   a controller programmed to send variable electric control signals to the said engine valve controlling means, said control signals duration comprising the algebraic sum of a basic signal duration and a correction signal duration;
   means for generating a basic signal duration determined by the controller as a function of engine operating conditions and being equal for all engine intake valves and equal for all engine exhaust valves; and
   means for generating a correction signal predetermined for each of the engine valve controlling means as a measure of the extent the performance of each engine valve controlling means varies from a predetermined standard, said correction signal generating means being operative in timed sequence to supply to the controller said predetermined correction signal just prior to a respective engine valve controlling means being activated.

12. The system of claim 11 wherein said correction signal generating means comprises:
   a rotatable member having individual codings thereon in spaced sequence, each coding representing a specific engine valve controlling means and containing information on the correction signal required by the said specific engine valve controlling means; and
   a sensor installed in proximity of the said rotatable member, said sensor being capable of reading the information contained in each coding on the rotatable member as it passes the sensor and transmitting said reading as a correction signal to said controller.

13. The system of claim 12 wherein each said coding is in the form of a tag and each tag is affixed to said rotatable member;
   means for rotating said rotatable member during engine operation with an angular velocity equal to half the crankshaft velocity on a four-stroke engine and equal to crankshaft velocity on a two-stroke engine, whereby said sensor will read the information on individual tags successively passing the proximity of the sensor and transmit a respective correction signal to the controller, the location of individual tags on said rotatable member being such that the information on each tag is read and sent to the control system just before the engine valve controlling means for which the tag was coded must be actuated.

14. The system of claim 11 further including:
   a high pressure source of fluid and a low pressure source of fluid;
   a cylinder head member adapted to be affixed to the engine and including a plurality of enclosed cavities;
   a plurality of poppet valves, each being associated with a respective one of said plurality of enclosed cavities;
   each said poppet valve being shiftable between a first and second position within said cylinder head member;
   a hydraulic actuator including a piston coupled to each said poppet valve and reciprocable within the respective enclosed cavity which thereby varies in displacement as each poppet valve moves;
   said cylinder head member having a high pressure port extending between the enclosed cavities and the high pressure source of fluid and a low pressure port extending between the enclosed cavities and the low pressure source of fluid;
   a high pressure valve and a low pressure valve for respectively regulating the flow of fluid in the high pressure and the low pressure ports of each of said plurality of enclosed cavities;
   control means cooperating with the high and low pressure valves for selectively coupling the enclosed cavities to the high pressure and low pressure sources to oscillate each poppet valve in timed relation to engine operation, wherein during each oscillation, some of the high pressure fluid used to reciprocate the poppet valve is returned to the high pressure source;
   said control means including means for controlling (i) the motion of each said poppet valve by varying the timing and duration of the said control means actuation, (ii) the timing of the valve opening and closing motions of each poppet valve by varying the timing of said control means actuation, and (iii) the stroke of each said poppet valve by varying the duration of said control means actuation; and means for varying the pressure of the pressure of the pressurized fluid whereby the acceleration, velocity and travel time of each poppet valve may also be controlled.

15. The system of claim 14 wherein said control means includes said individual engine valve controlling means for each said poppet valve, whereby the duration of the control signal may be individually adjusted for each engine valve controlling means in all cylinders so as to assure equal poppet valve strokes in all cylinders.

* * * * *

Adverse Decision in Interference

Patent No. 5,255,641, Michael M. Schechter, VARIABLE ENGINE VALVE CONTROL SYSTEM, Interference No. 103,449, final judgment adverse to the patenttee rendered August 2, 2000, as to claims 1-10.
*(Official Gazette February 13, 2001)*